US012584785B2

(12) United States Patent
Lau et al.

(10) Patent No.: US 12,584,785 B2
(45) Date of Patent: *Mar. 24, 2026

(54) DISTRIBUTED ACOUSTIC SENSING (DAS) SYSTEM FOR ACOUSTIC EVENT DETECTION BASED UPON COVARIANCE MATRICES AND RELATED METHODS

(71) Applicant: EAGLE TECHNOLOGY, LLC, Melbourne, FL (US)

(72) Inventors: Chad Lau, Melbourne, FL (US); Mark D. Rahmes, Melbourne, FL (US); Austin Brigham, Melbourne, FL (US); Kevin Gustke, Merritt Island, FL (US); Stephen Bauman, Palm Bay, FL (US); John Gallo, Jacksonville, FL (US); Shawn Patrick Gallagher, Grant, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 274 days.

This patent is subject to a terminal disclaimer.

(21) Appl. No.: 18/308,925

(22) Filed: Apr. 28, 2023

(65) Prior Publication Data

US 2024/0361175 A1 Oct. 31, 2024

(51) Int. Cl.
*G01H 9/00* (2006.01)
*G01D 5/353* (2006.01)

(52) U.S. Cl.
CPC ......... *G01H 9/004* (2013.01); *G01D 5/35354* (2013.01); *G01D 5/35361* (2013.01)

(58) Field of Classification Search
CPC ........... G01D 5/35361; G01D 5/35354; G01D 5/35332; G01H 9/004
See application file for complete search history.

(56) References Cited

U.S. PATENT DOCUMENTS

| | | | |
|---|---|---|---|
| 5,194,847 A | 3/1993 | Taylor et al. | |
| 7,038,636 B2 | 5/2006 | Larouche et al. | |
| 9,899,746 B2 | 2/2018 | Grandfield et al. | |

(Continued)

FOREIGN PATENT DOCUMENTS

| | | |
|---|---|---|
| CN | 108154495 | 6/2018 |
| CN | 108932705 | 12/2018 |

(Continued)

OTHER PUBLICATIONS

Saul Dobilas "LSTM Recurrent Neural Networks-How toTeach a Network to Remember the Past" https://towardsdatascience.com/lstm-recurrent-neural-networks-how-to-teach-a-network-to-remember-the-past-55e54c2ff22e pp. 20.

(Continued)

*Primary Examiner* — Helen C Kwok
(74) *Attorney, Agent, or Firm* — ALLEN, DYER, DOPPELT, + GILCHRIST, P.A.

(57) ABSTRACT

A distributed acoustic sensing (DAS) system may include an optical fiber, a phase-sensitive OTDR (φ-OTDR) coupled to the optical fiber, and a processor cooperating with the φ-OTDR. The processor may be configured to generate a series of covariance matrices for DAS data from the φ-OTDR, and determine an acoustic event based upon comparing the series of covariance matrices with a corresponding Toeplitz matrix.

20 Claims, 24 Drawing Sheets

(56) References Cited

U.S. PATENT DOCUMENTS

| | | | |
|---|---|---|---|
| 9,960,494 | B2 | 5/2018 | Tatarnikov et al. |
| 10,044,107 | B2 | 8/2018 | Elliot et al. |
| 10,643,131 | B1 | 5/2020 | Loic et al. |
| 10,873,456 | B1 | 12/2020 | Dods et al. |
| 2006/0050009 | A1 | 3/2006 | Ho et al. |
| 2014/0022530 | A1 | 1/2014 | Farhadiroushan et al. |
| 2014/0025319 | A1* | 1/2014 | Farhadiroushan .... E21B 47/007 |
| | | | 702/56 |
| 2016/0191163 | A1* | 6/2016 | Preston ................... G01L 1/242 |
| | | | 398/16 |
| 2016/0259079 | A1 | 9/2016 | Wilson et al. |
| 2017/0076196 | A1 | 3/2017 | Sainath et al. |
| 2017/0235006 | A1 | 8/2017 | Ellmauthaler et al. |
| 2017/0321540 | A1 | 11/2017 | Lu et al. |
| 2019/0026631 | A1 | 1/2019 | Carr et al. |
| 2020/0042873 | A1* | 2/2020 | Daval Frerot ......... G06N 3/048 |
| 2020/0234137 | A1 | 7/2020 | Chen et al. |
| 2020/0257976 | A1* | 8/2020 | Polanía Cabrera .... G06N 3/045 |
| 2021/0042590 | A1 | 2/2021 | Watts |
| 2021/0358497 | A1 | 11/2021 | Sun et al. |
| 2021/0397945 | A1 | 12/2021 | Vahdat et al. |
| 2022/0076044 | A1* | 3/2022 | Peters ................... G06F 17/153 |
| 2022/0109950 | A1* | 4/2022 | Tadayon ................ G06N 20/00 |
| 2022/0114438 | A1* | 4/2022 | Pandev ............. G01N 21/9501 |
| 2022/0196462 | A1 | 6/2022 | Han et al. |
| 2022/0284283 | A1* | 9/2022 | Yin .......................... G06N 3/04 |
| 2022/0390599 | A1 | 12/2022 | Fan et al. |
| 2023/0014976 | A1 | 1/2023 | Yacoby et al. |
| 2023/0025986 | A1 | 1/2023 | Xia et al. |
| 2023/0251646 | A1 | 8/2023 | Ba et al. |
| 2023/0358562 | A1 | 11/2023 | Englund |
| 2024/0302229 | A1* | 9/2024 | Lindsey ................. G01L 1/242 |
| 2024/0361175 | A1 | 10/2024 | Lau et al. |
| 2024/0361176 | A1* | 10/2024 | Lau .................... G01D 5/35332 |
| 2024/0361177 | A1* | 10/2024 | Lau ........................ G06N 3/044 |
| 2024/0372755 | A1* | 11/2024 | Choi ..................... H04L 25/021 |

FOREIGN PATENT DOCUMENTS

| | | |
|---|---|---|
| CN | 110120230 A | 8/2019 |
| CN | 110718234 A | 1/2020 |
| CN | 113222972 A | 8/2021 |
| CN | 114627895 A | 6/2022 |
| JP | 2019075108 A | 5/2019 |
| JP | 2020154561 A | 9/2020 |
| WO | WO2020174459 A1 | 9/2020 |
| WO | WO2021205669 | 10/2021 |

OTHER PUBLICATIONS

Norlander et al. "Latent space conditioning for improved classification and anomaly detection" Lund University https://arxiv.org/abs/1911.10599: Dec. 2, 2019; pp. 18.

Klys et al. "Learning Latent Subspaces in Variational Autoencoders" University of Toronto Vector Institute: 32nd Conference on Neural Information Processing Systems (NeurIPS 2018), Montréal, Canada. pp. 11.

Sara Torres Fernández "Designing Variational Autoencoders for Image Retrieval" Degree Project In Electrical Engineering, Second Cycle, 30 Credits Stockholm, Sweden 2018; pp. 61.

Papernot et al. "Distillation as a Defense to Adversarial Perturbations against Deep Neural Networks" Accepted to the 37th IEEE Symposium on Security & Privacy, IEEE 2016. San Jose, CA: pp. 16.

Atienza et al. "Deep Generative models for distributed acoustic sensors (DAS)" Computer Science: Dec. 12, 2021; Abstract only.

Wei et al. "Variations in Variational Autoencoders—A Comparative Evaluation" Digital Object Identifier 10.1109/ACCESS.2020.3018151: pp. 20.

Venketeswaran et al. "Recent advances in machine learning for fiber optic sensor applications" Advanced Intelligent Systems: 2022; pp. 24.

Olcer et al. "Random matrix theory based distributed acoustic sensing" In Optical Sensors 2019 (vol. 11028, pp. 79-86). SPIE. (Apr. 2019). pp. 9.

Nagat Masued "Maximum Eigenvalue based detection in fiber-optic distributed acoustic sensors applications" https://spie.org/spie-sensing-imaging/presentation/Maximum-Eigenvalue-based-detection-in-fiber-optic-distributed-acoustic-sensors/12271-18; Abstract Only.

Hoppe et al. "Principal component analysis for emergent acoustic signal detection with supporting simulation results" The Journal of the Acoustical Society of America: 130(4): Oct. 3, 2011; Abstract only.

Mesaros et al. "Acoustic scene classification: an overview of DCASE 2017 challenge entries" In 2018 16th International Workshop on Acoustic Signal Enhancement (IWAENC) (pp. 411-415). IEEE. pp. 5.

Eronen et al. "Audio-based context recognition" IEEE Transactions on Audio, Speech, and Language Processing, 14(1) Jan. 2006; 321-329.

Han et al. "Convolutional Neural Networks With Binaural Representations And Background Subtraction For Acoustic Scene Classification" Detection and Classification of Acoustic Scenes and Events: Nov. 16, 2017; pp. 5.

Lostanlen et al. "Binaural scene classification with wavelet scattering" Detection and Classification of Acoustic Scenes and Events 2016 (DCASE 2016) Sep. 3, 2016; pp. 5.

Huot et al. "Detection and characterization of microseismic events from fiber-optic DAS data using deep learning"https://arxiv.org/abs/2203.07217: Submitted on Mar. 14, 2022; pp. 27.

Ngo, K. "Digital signal processing algorithms for noise reduction, dynamic range compression, and feedback cancellation in hearing aids" https://theses.eurasip.org/media/theses/documents/ngo-kim-digital-signal-processing-algorithms-for-noise-reduction-dynamic-range-compression-and-feedback-cancellation-in-hearing-aids.pdf (Doctoral dissertation).Retrieved on Jun. 7, 2017; pp. 214.

Bublin, M "Event detection for distributed acoustic sensing: combining knowledge-based, classical machine learning, and deep learning approaches" Sensors, 21(22), 7527: Nov. 12, 2021; pp. 17.

Ibrahim et al. "Integrated principal component analysis denoising technique for phase-sensitive optical time domain reflectometry vibration detection" .Applied Optics, 59(3): Jan. 20, 2020; 669-675.

Zheng et al. "Clustering by Errors: A Self-Organized Multitask Learning Method for Acoustic Scene Classification" Sensors 2022, 22(1), 36: Dec. 22, 2021; pp. 22.

Sachdeva et al. "Acoustic Scene Classification using Fusion of Features and Random Forest Classifier" 2022 9th International Conference on Computing for Sustainable Global Development (INDIACom) (pp. 654-658). IEEE.

U.S. Appl. No. 18/308,966, filed Apr. 28, 2023 Lau et al.

U.S. Appl. No. 18/308,991, filed Apr. 28, 2023 Lau et al.

\* cited by examiner

—42

—43

TOEPLITZ MATRIX STRUCTURE

|  | CAPTURE WINDOW $T_0$ | ... | CAPTURE WINDOW $T_{K-1}$ |
|---|---|---|---|
| FREQUENCY BAND 0 | $\tilde{\tau}_0^0(\eta)$ | ... | $\tilde{\tau}_0^{(K-1)}(\eta)$ |
| ⋮ |  | ... |  |
| FREQUENCY BAND M - 1 | $\tilde{\tau}_{M-1}^0(\eta)$ | ... | $\tilde{\tau}_{M-1}^{(K-1)}(\eta)$ |

1D TOEPLITZ METRICS

DISTRIBUTED ACOUSTIC SENSING (DAS) SYSTEM FOR ACOUSTIC EVENT DETECTION BASED UPON COVARIANCE MATRICES AND RELATED METHODS

TECHNICAL FIELD

The present disclosure relates to acoustic sensing, and more particularly to distributed acoustic sensing (DAS) systems and related methods.

BACKGROUND

Distributed acoustic sensing (DAS) is used to detect acoustic events in various applications, such as perimeter security, oil and gas exploration and extraction (including pipeline monitoring), and building structural health monitoring, for example. A DAS system leverages an optical fiber(s) along the area to be monitored, which may be anywhere from several meters to many kilometers in length. The optical fiber is coupled to a phase-sensitive optical time domain reflectometer ($\phi$-OTDR). The $\phi$-OTDR propagates laser light pulses through the optical fiber, and a small portion of the light is reflected back along the fiber due to a process known as Rayleigh Backscatter. Incident acoustic waves from noise (acoustic) events along the optical fiber cause optical phase changes in the scattering of the light pulses. Backscattered light from these events returns to the $\phi$-OTDR, from which positions and magnitudes of different acoustic events may be determined. The intensity and phase of the reflected light is measured as a function of time after transmission of the laser pulse.

One example DAS system for ranging in oil and gas applications is U.S. Pat. Pub. No. 2016/0259079 to Wilson et al. This publication discloses a passive system for ranging between two wellbores where a distributed acoustic sensor system is deployed in a first wellbore and a drill bit in a second wellbore being drilled is utilized and an acoustic source to generate an acoustic signal for measurement by the distributed acoustic sensor system. The dynamic strain along the distributed acoustic sensor system is detected with an optical interrogation system and utilized to determine direction and distance between the first wellbore and the second wellbore.

Despite the existence of such systems, further developments in DAS systems may be desirable in various applications.

SUMMARY

A distributed acoustic sensing (DAS) system may include an optical fiber, a phase-sensitive OTDR ($\phi$-OTDR) coupled to the optical fiber, and a processor cooperating with the $\phi$-OTDR. The processor may be configured to generate a series of covariance matrices for DAS data from the $\phi$-OTDR, and determine an acoustic event based upon comparing the series of covariance matrices with a corresponding Toeplitz matrix.

In an example embodiment, the processor may be further configured to generate a histogram for the DAS data and determine a noise power level from the histogram, and the processor may determine the acoustic event further based upon the noise power level. In another example implementation, the processor may be further configured to perform a weighted combination of polynomial fitting and median filtering in the frequency domain to fit a curve to the DAS data, determine a noise power level from the curve, and determine the acoustic event further based upon the noise power level.

In an example implementation, the processor may be further configured to map the acoustic event to a spatial channel from among a plurality thereof, with the plurality of spatial channels corresponding to different positions along the optical fiber. More particularly, the processor may be configured to determine acoustic events for a plurality of different spatial channels based upon comparing the series of covariance matrices with different corresponding Toeplitz matrices. For example, the processor may be further configured to generate an order of preference for the acoustic events using a game theoretic model.

In accordance with another example, the processor may be further configured to generate an output event table including scalar values and timestamps of detected events for respective spatial channels. In some embodiments, the processor may be further configured to perform bandpass filtering and re-centering of the DAS data relative to at least one spatial channel prior to generating the series of covariance matrices.

A related DAS device may include a $\phi$-OTDR to be coupled to an optical fiber, and a processor cooperating with the $\phi$-OTDR, similar to those discussed briefly above. A related DAS method may include generating a series of covariance matrices using a processor for DAS data from a $\phi$-OTDR coupled to an optical fiber, and determining an acoustic event using the processor based upon comparing the series of covariance matrices with a corresponding Toeplitz matrix.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime and multiple prime notation are used for like elements in different embodiments.

Figure 1:
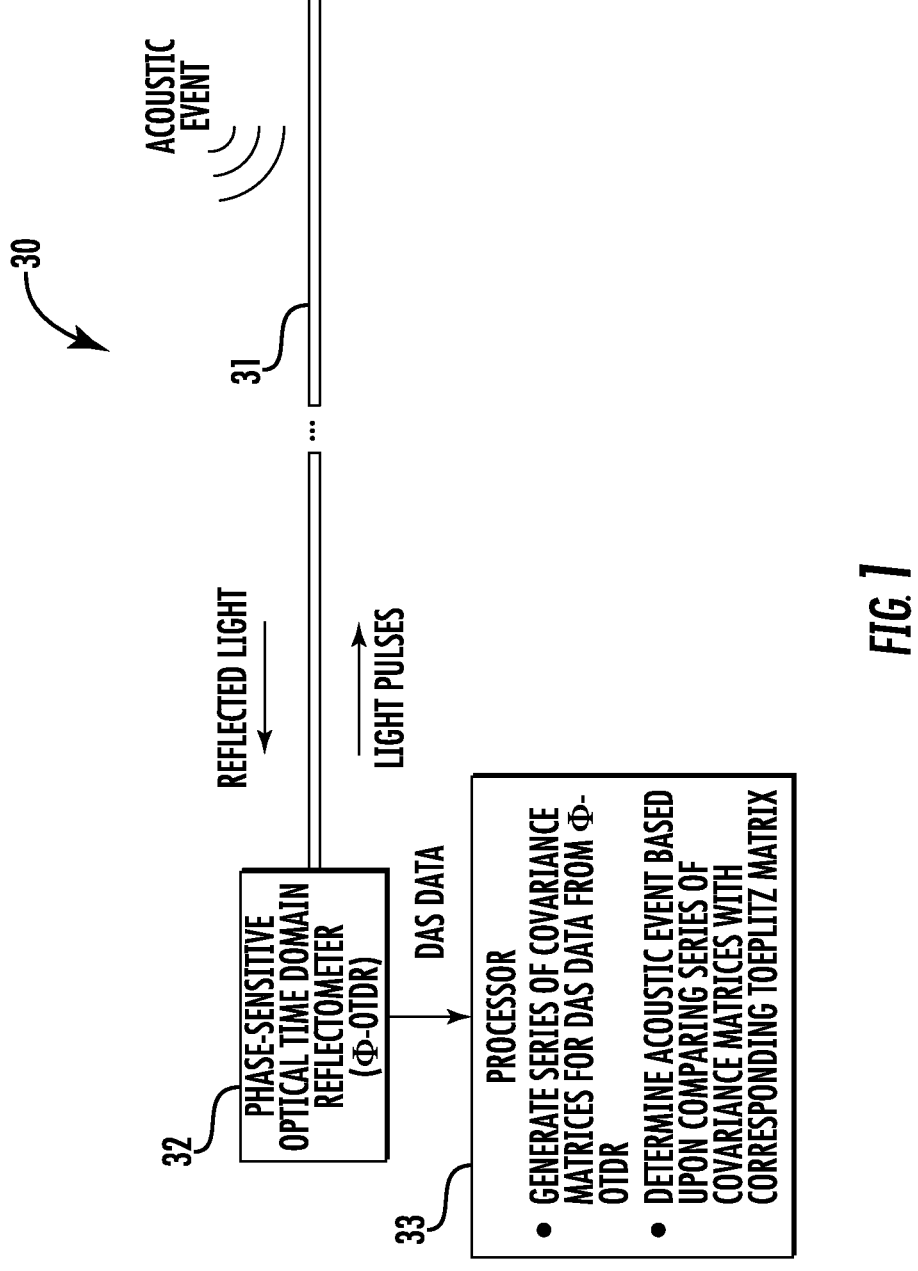
FIG. 1 is a schematic block diagram of distributed acoustic sensing (DAS) system in accordance with an example embodiment.
Figure 2:
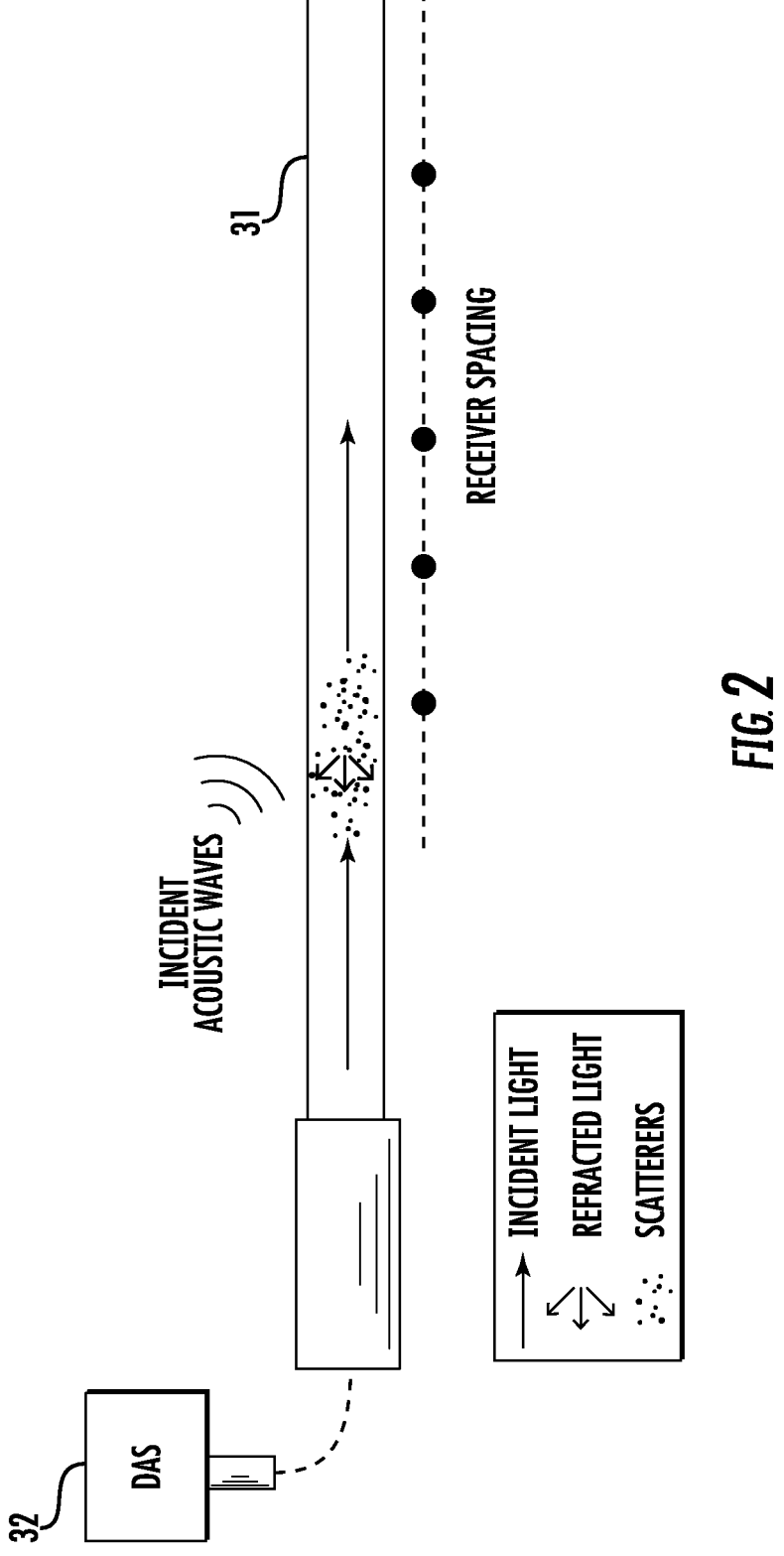
FIGS. 2 and 3 are schematic block diagrams illustrating optical time domain reflectometry within the DAS system of FIG. 1.
Figure 3:
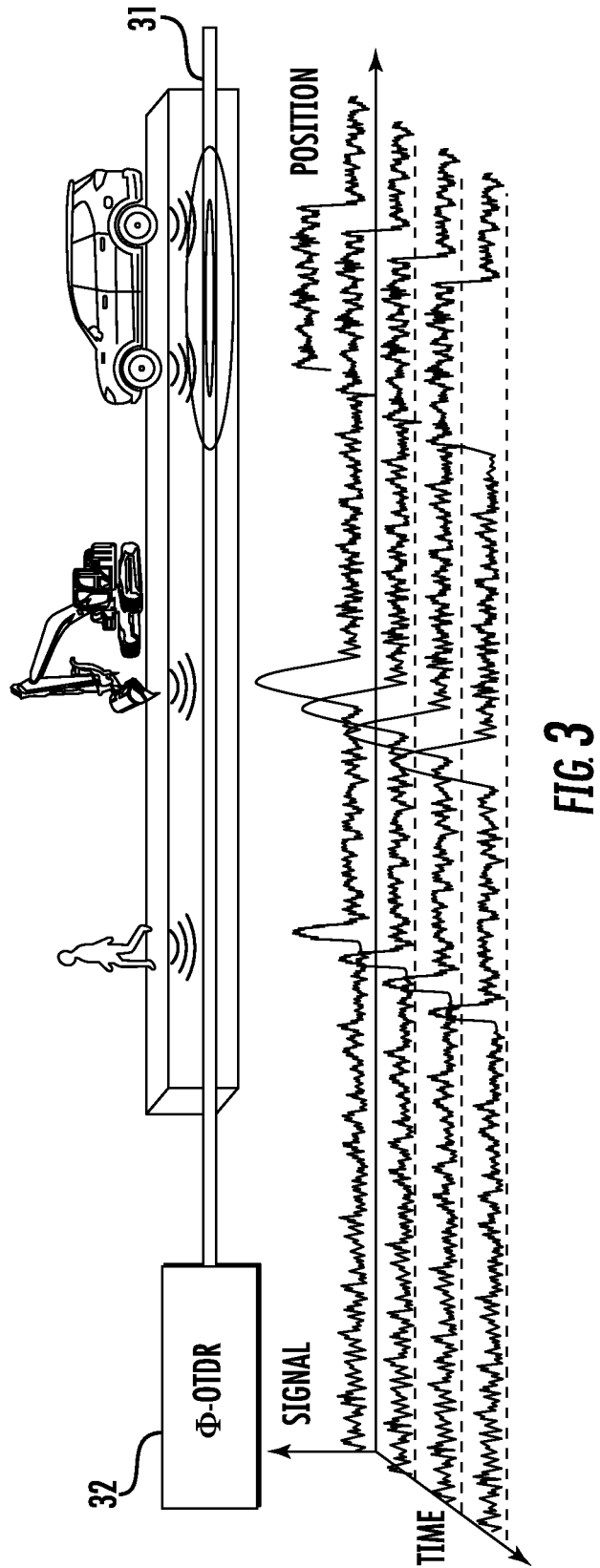
Figure 4:
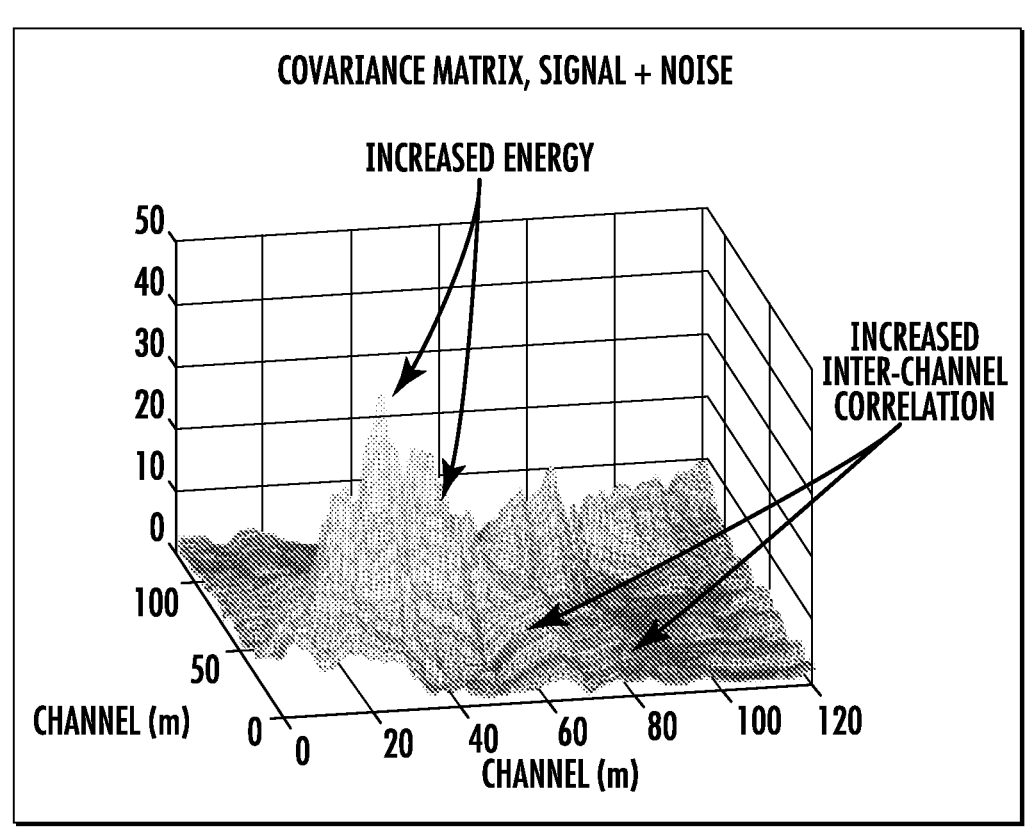
FIG. 4 is a 3D graph of DAS data including signal and noise components captured by the DAS system of FIG. 1.
Figure 5:
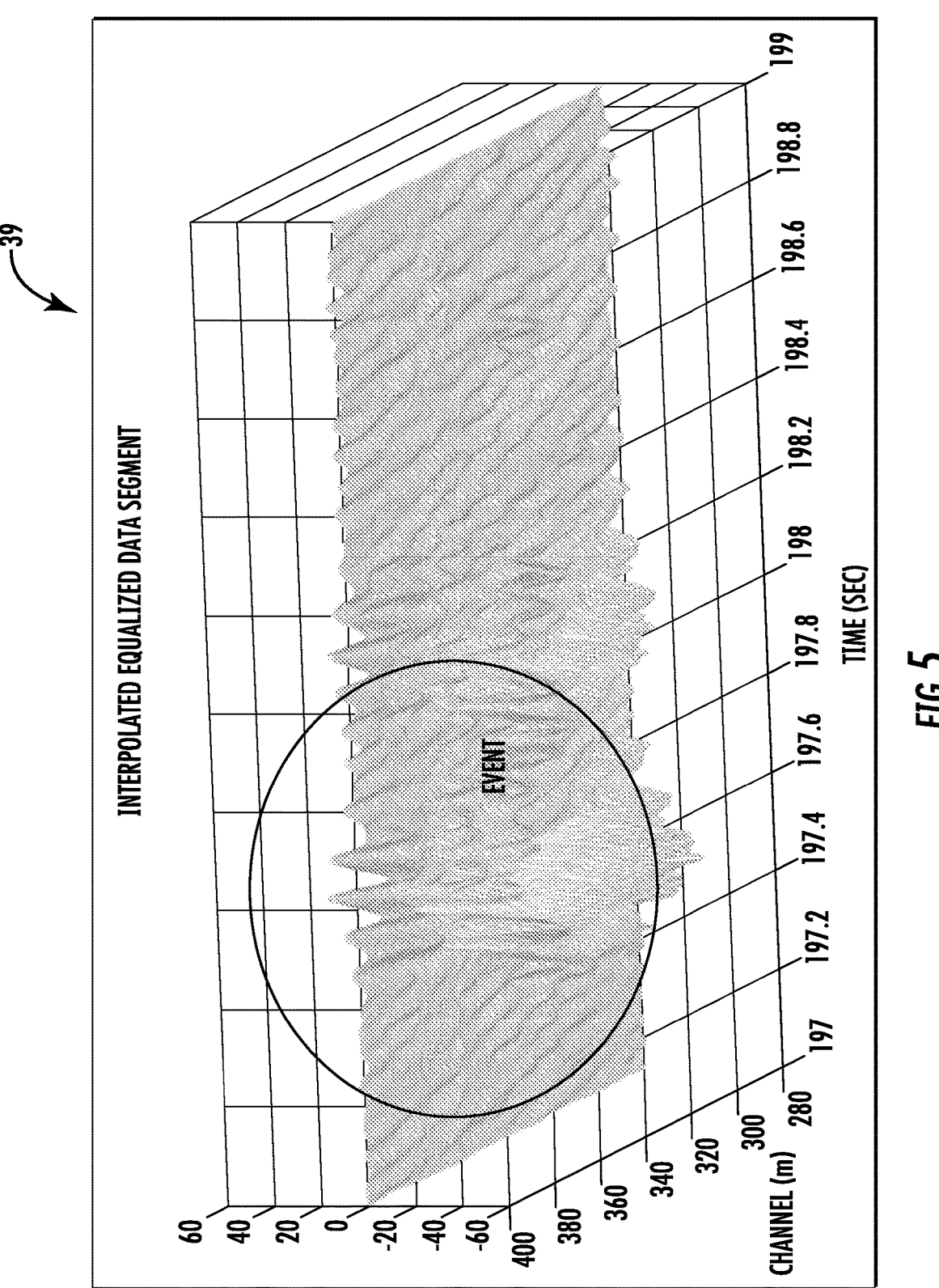
FIG. 5 is a graph of an interpolated equalized data segment over time and different channels associated with the DAS data of FIG. 4.
Figure 6:
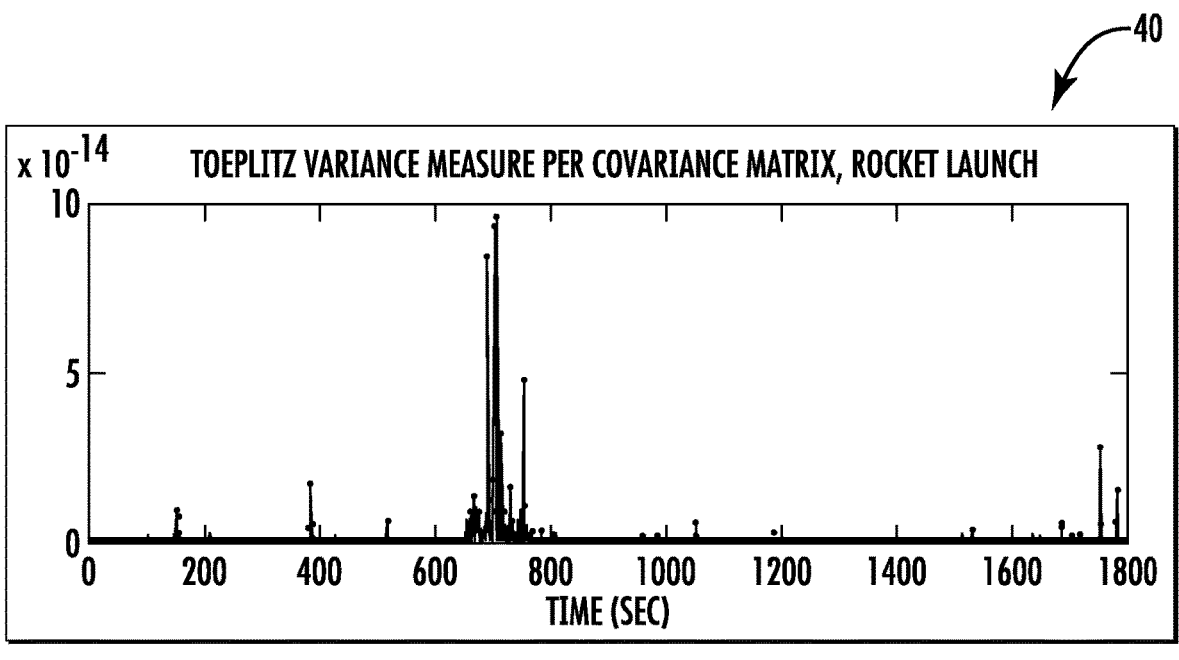
FIG. 6 is a graph of Toeplitz variance measure per covariance matrix over time associated with the DAS data of FIG. 4.
Figure 7:
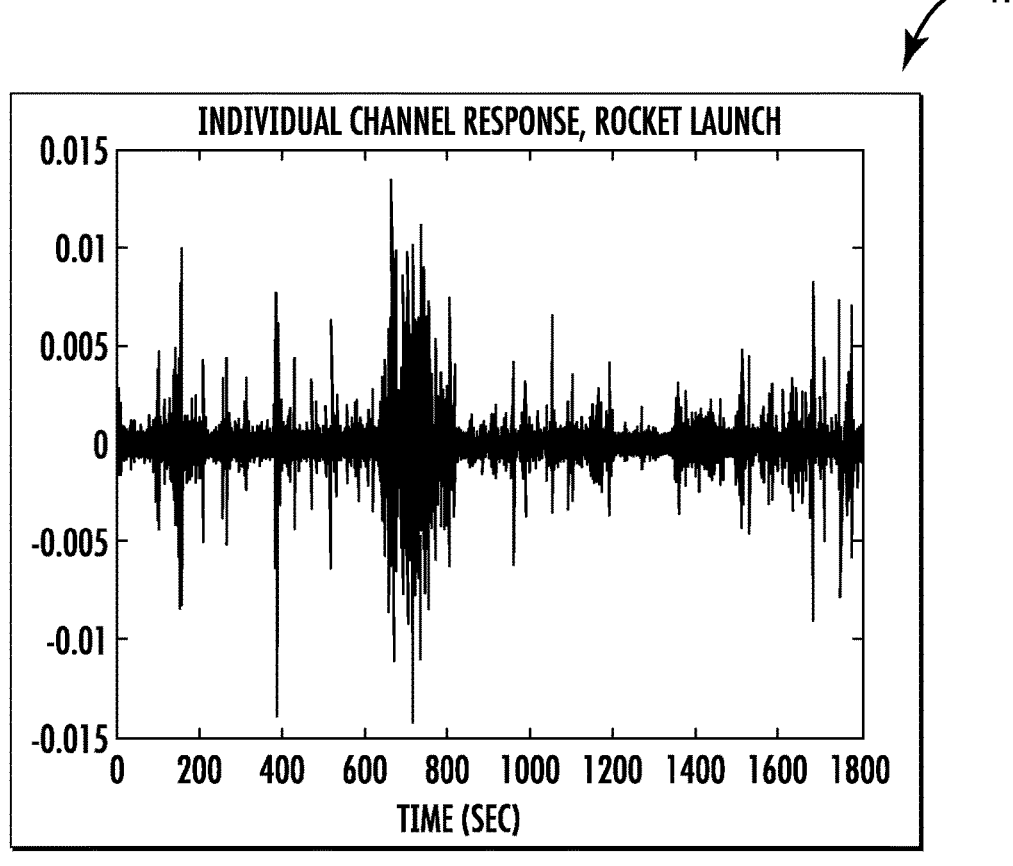
FIG. 7 is a graph of an individual channel response associated with an acoustic event of FIG. 6.
Figure 8:
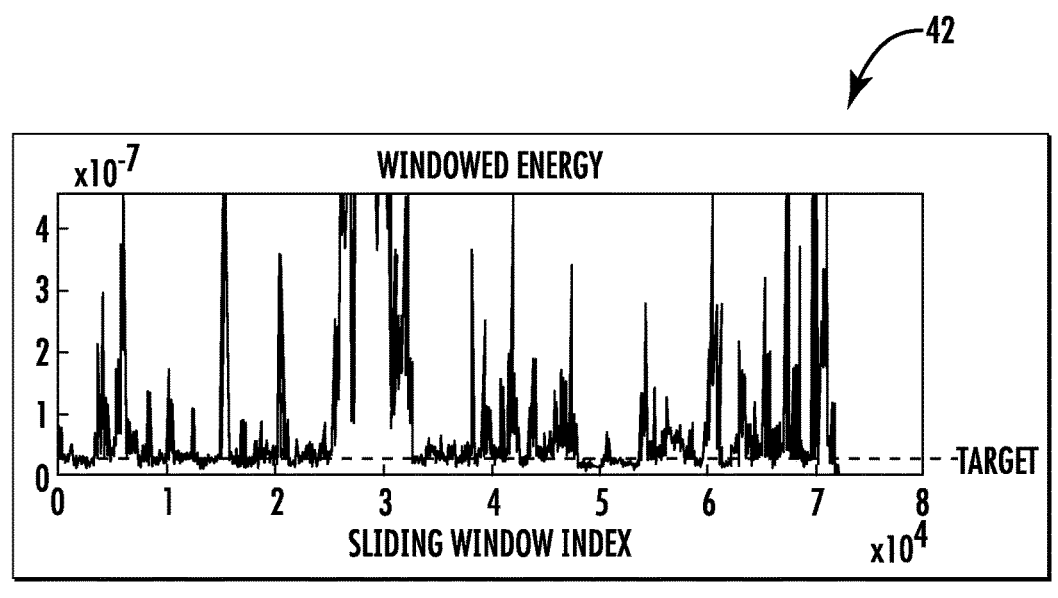
FIG. 8 is a graph of windowed variance over a sliding window index associated with the acoustic event of FIG. 6.
Figure 9:
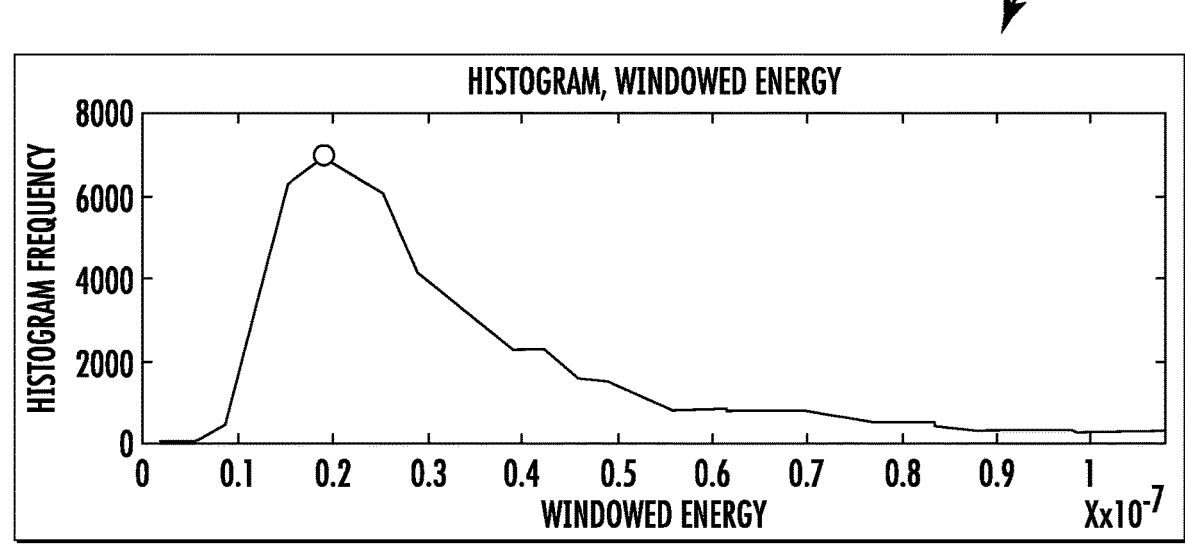
FIG. 9 is a graph of histogram frequency over a windowed variance for the acoustic event of FIG. 6.

Referring initially to FIGS. 1-3, a distributed acoustic sensing (DAS) system 30 is first described. The DAS system 30 illustratively includes an optical fiber 31, an optical time domain reflectometer, which in the present embodiment is a phase-sensitive OTDR (φ-OTDR) 32 (also known as an interrogator) coupled to the optical fiber, and a processor 33 cooperating with the φ-OTDR. As will be discussed further below, the processor 33 is configured to generate a series of covariance matrices for DAS data collected by the φ-OTDR 32, and determine an acoustic event that occurs along the length of the optical fiber 31 based upon comparing the series of covariance matrices with a corresponding Toeplitz matrix.

The φ-OTDR 32 introduces incident light into the fiber 31 in the form of laser light pulses. Incident acoustic waves impacting the fiber from an acoustic event (FIG. 2) cause optical phase changes in the light pulses, resulting in refracted light which is directed back to, and detected by, the φ-OTDR 32. In the example illustrated in FIG. 3, different types of example acoustic events are shown, namely acoustic waves from footsteps, construction equipment, and a vehicle, along with the resulting signal return detected by the φ-OTDR 32 over time.

By way of background, typical DAS systems perform event detection in different ways. One approach is detection theory, in which measurements are mapped to a numerical metric, and then baseline metric statistics are established for background noise. Hypothesis testing (binary classification) may be performed, in which a null hypothesis (H0) means noise only is present and an alternative hypothesis (H1) means an event signal plus noise is present. Still another approach to acoustic event detection involves machine learning (ML) or deep learning (DL) for raw data processing. That is, raw DAS data is pre-processed, and metrics are evaluated via ML/DL for binary classification. Still another event detection approach involves Digital Signal Processing (DSP). More particularly, random matrix theory is employed to examine distributions of extremal eigenvalues of a covariance matrix, and then Principal Component Analysis (PCA) is used to detect change in eigenvalue subspace of the covariance matrix.

In accordance with the present example, the processor 33 utilizes a covariance matrix-based approach which uses array process to map a covariance matrix of a subset of fiber channels to a scalar value. As will be appreciated by those skilled in the art, channels in a DAS system corresponding to different locations or positions along the optical fiber 31. The present approach requires no machine learning nor training, and provides for self-calibrating pre-processing.

More particularly, the processor 33 performs frequency-domain preprocessing for target events of interest, including resampling and/or bandpass filtering and recentering at DC equalization. Different approaches for estimating background noise in spatial channels may be used, which will be discussed further below. The processor 33 further maps a sequence of covariance matrices to 1D a metrics vector. This is done by estimating the distribution of metrics for background noise, and may involve a classical statistical threshold(s) test for detection channelization. Moreover, processing may be performed in parallel on multiple frequency sub-bands.

In some embodiments, the processor 33 may implement game theory optimization to combine covariance metrics derived with multiple capture periods. Furthermore, snapshots of raw data passing a threshold test may be flagged and ranked based on a time duration of metrics exceeding a threshold(s). One technical advantage of this approach is data reduction, in that the output may be flagged timestamps, such that further classification/characterization can be focused on subsets of flagged data without having to deal with large data sets of background noise.

Referring additionally to FIGS. 4-9, an example acoustic event scenario and a first approach for estimating background noise in spatial channels are described. More particularly, the graphs 38, 39, and 40 illustrate an acoustic event captured by a φ-OTDR 32 in an example implementation. The acoustic event results in increased signal energy from the reflected light occurring in the channels closest to the acoustic event, as well as increased inter-channel correlation in the channels corresponding to the location where the event occurred.

In the first equalization approach for estimating background noise, the goal is for covariance matrices for noise-only cases to be diagonally-dominant. However, they will generally not be perfect diagonals due to spatial correlation in noise and transient events. Referring to the graphs 41, 42 and the histogram 43, the processor 33 estimates background noise in the time domain by iteratively excising upper tails of average energy distribution. This continues until a noise-only distribution remains. In the original raw data, the processor 33 finds the longest contiguous segment with windowed energy near the peak energy value, and estimates average noise power for this channel as the average power of this segment (indicated by a dashed target line in FIG. 8). This approach is advantageous in terms of processing requirements, in that each channel may be scaled in the selected subset of fiber channels by the reciprocal of noise power. The processor 33 generates the histogram 43 from the DAS data and determines a noise power level (here $0.19 \times 10^{-7}$), also referred to as a Toeplitz metric herein, from the peak of the histogram. From this, the processor 33 may then determine acoustic events based upon the noise power level, e.g., those signal peaks that exceed the target line shown in FIG. 8.

Figure 10:
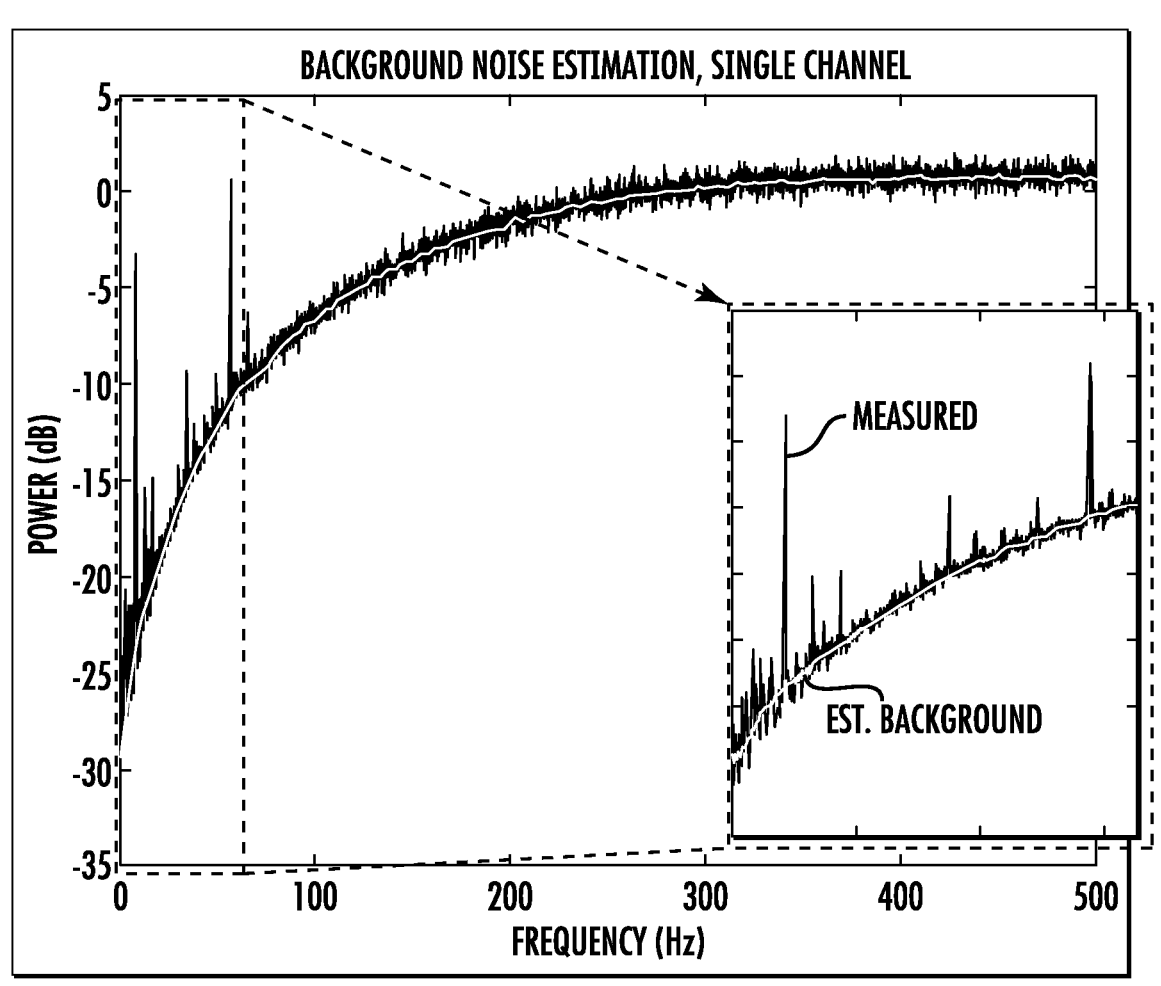
FIG. 10 is a graph of power vs. frequency illustrating an example approach for background noise estimation for a single channel in an example embodiment.

A second equalization approach is now described with reference to the graph 44 of FIG. 10. More particularly, this is a heuristic approach for estimating background noise in the frequency domain using spectral whitening techniques. DAS-based noise typically is non-white, and noise power spectral density increases with frequency. Bandlimited events may arise unexpectedly during the capture period for estimating background noise. The processor 33 is configured to apply a hybrid approach with polynomial fitting and median filtering. This approach ignores outliers (spectral peaks), and fits a curve to the background noise. As such, average noise per channel may be estimated from the fit curve in the frequency domain. This approach advantageously allows for scaling of each channel in a selected subset of channels by the reciprocal of the noise power, and estimates average power of individual sub-bands from the curve.

Figure 11:
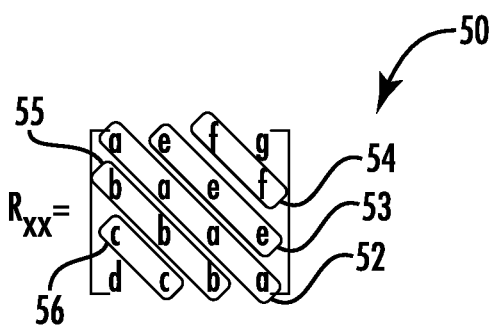
FIG. 11 is a Toeplitz matrix structure which may be used by the DAS system of FIG. 1 to determine acoustic events.
Figure 12:
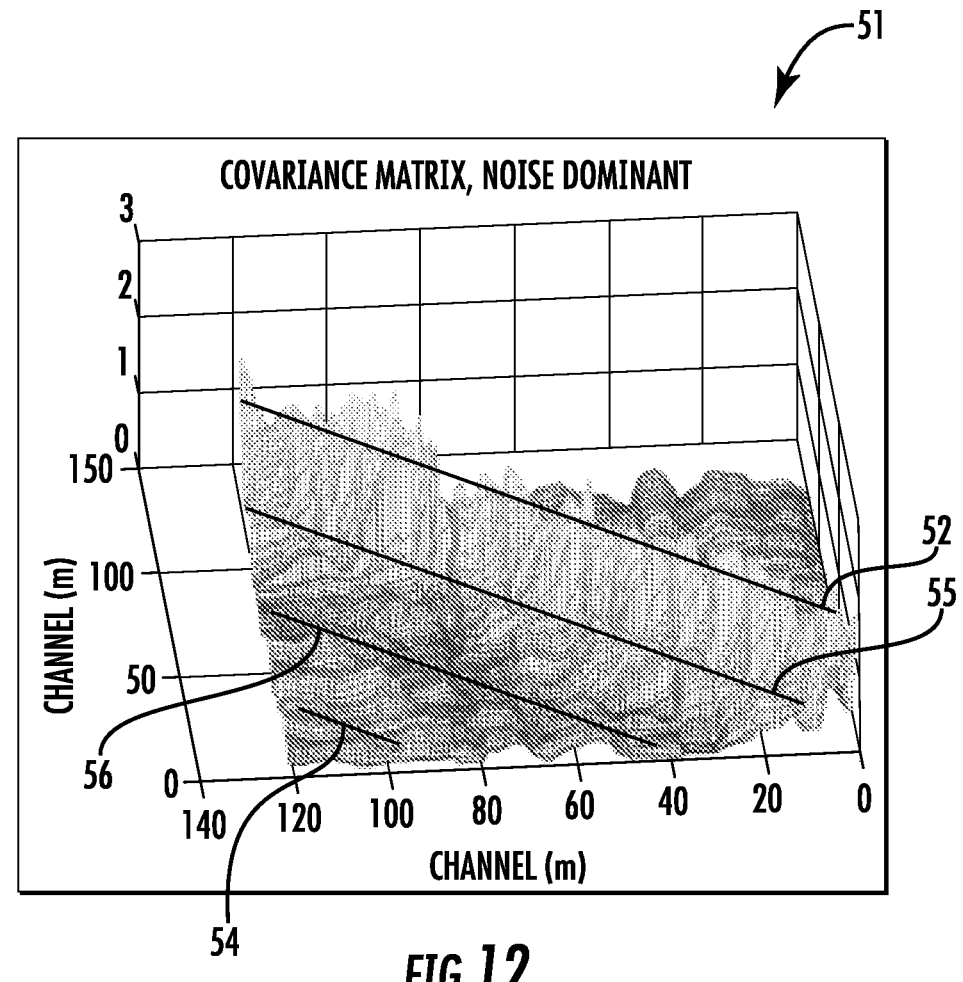
FIG. 12 is a 3D graph corresponding to a noise-dominant covariance matrix of DAS data in an example embodiment.

Referring additionally to the Toeplitz matrix structure 50 of FIG. 11 and the graph 51 of FIG. 12, noise-only covariance matrices are diagonally dominant, and diagonally-dominant matrices are "Toeplitz-like". Toeplitz matrices have identical diagonal and sub-diagonal elements. The present approach advantageously provides a metric to measure the closeness of a covariance matrix to the ideal Toeplitz structure. The Toeplitz metric is determined by measuring a variance of each sub-diagonal. More particularly, a purely Toeplitz matrix will have zero variance, and a noise-only R_xx matrix exhibits low variance. Moreover, a main diagonal increase corresponds to increased energy, where an off diagonal increase corresponds to an increased correlation of a local subpopulation of channels, as seen in the 3D graph 51 of the covariance matrix for a noise-dominant DAS data subset. The processor 33 may output an RMS "mean" value of the sub-diagonal variance, for example. That is, the processor 33 maps each covariance matrix to a single scalar metric, which not only helps to identify acoustic events relative to the Toeplitz metric, but may also provide a significant savings in terms of data transmission and storage, for example.

Figure 13:
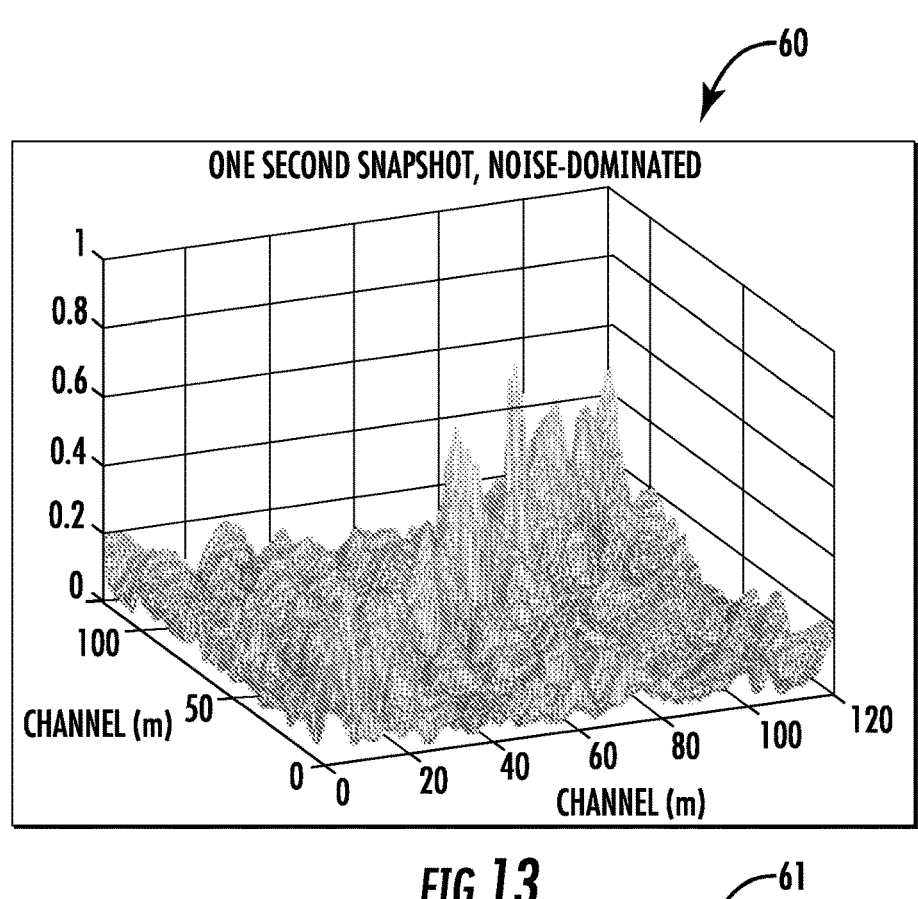
FIG. 13 is 3D graph of a one-second snapshot corresponding to a noise-dominated covariance matrix of DAS data in an example embodiment.
Figure 14:
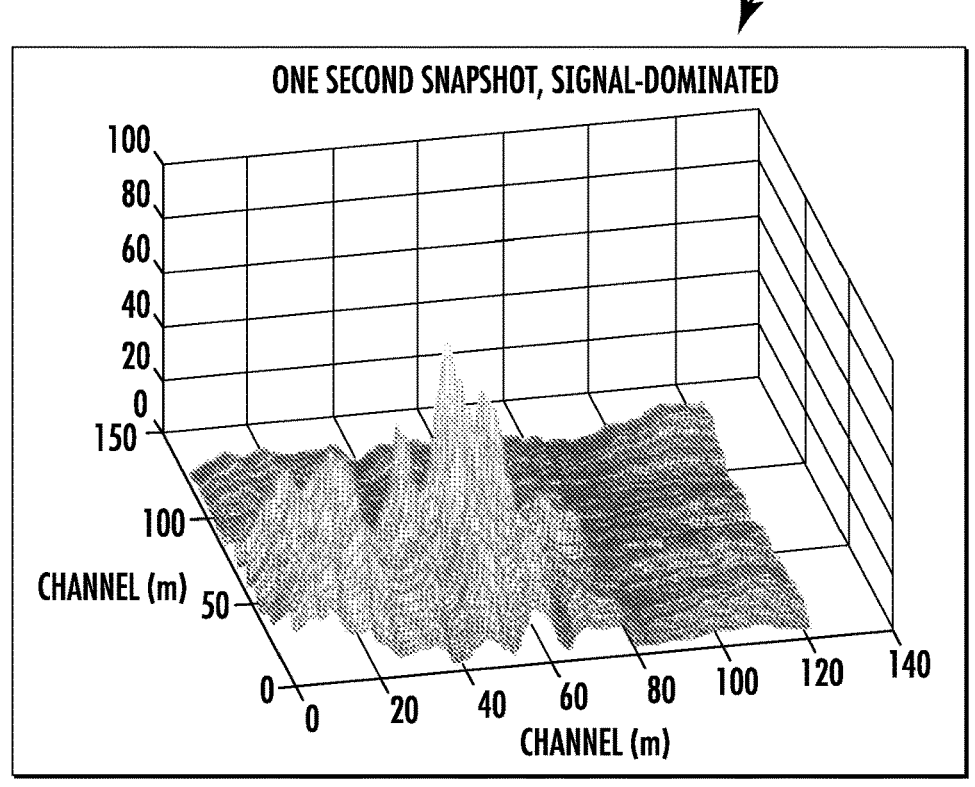
FIG. 14 is a 3D graph of a one-second snapshot corresponding to a signal-dominated covariance matrix of DAS data in an example embodiment.
Figure 15:
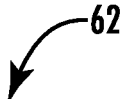
FIG. 15 is a graph of sub-diagonal variance vs. distance from the main diagonal and associated Toeplitz metrics in an example embodiment.
Figure 15:
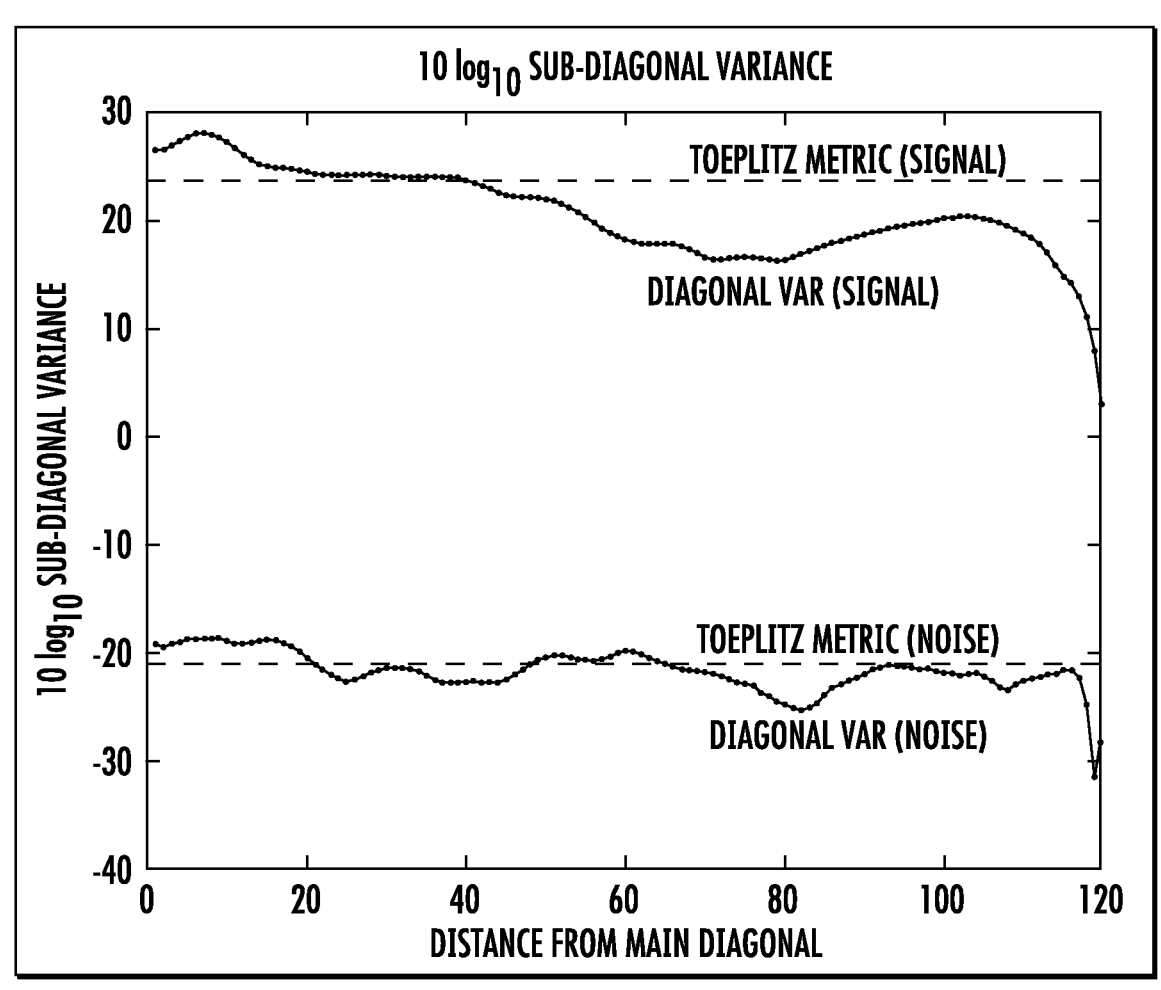

The foregoing will be further understood with reference to the graphs 60, 61, and 62 of FIGS. 13-15, respectively. The graph 60 provides a 3D view of a noise-dominated covariance matrix for a one second snapshot of DAS data, which results in a diagonal spine across the graph. On the other hand, the graph 61 has localized peaks centered at the affected channels. The graph 62 illustrates sub-diagonal variance on a logarithmic scale for signal and noise variance, as well as the associated Toeplitz metrics for both signal and noise, and accordingly how the Toeplitz-like structure can be exploited for acoustic event detection, as will be appreciated by those skilled in the art.

The above-described approach has several technical advantages. For example, it does not rely on hard-coded baseline or threshold values. Rather, the baseline (null-hypothesis or Toeplitz metric) values are determined from "gaps" between events. Furthermore, the detection threshold(s) may be automatically computed with each DAS data capture for enhanced accuracy. Furthermore, with respect to event detection, the present approach provides for an association of consecutive Toeplitz metrics which exceed a threshold(s) as an acoustic event. More particularly, multiple thresholds may be used in some configurations to provide a greater event detection confidence indicator. Detected events may be ranked by various categories as well. One such category is by time duration, which, in turn, may be used to separate different classes of events, such as impulsive vs. long-duration acoustic/seismic events, for example. Another category is maximum threshold exceeded, which may again help provide an enhanced confidence. The present approach also advantageously allows for a straight-forward output event table to be generated, which may flag timestamps of each detected event and/or record the maximum threshold exceeded, for example.

Figure 16:
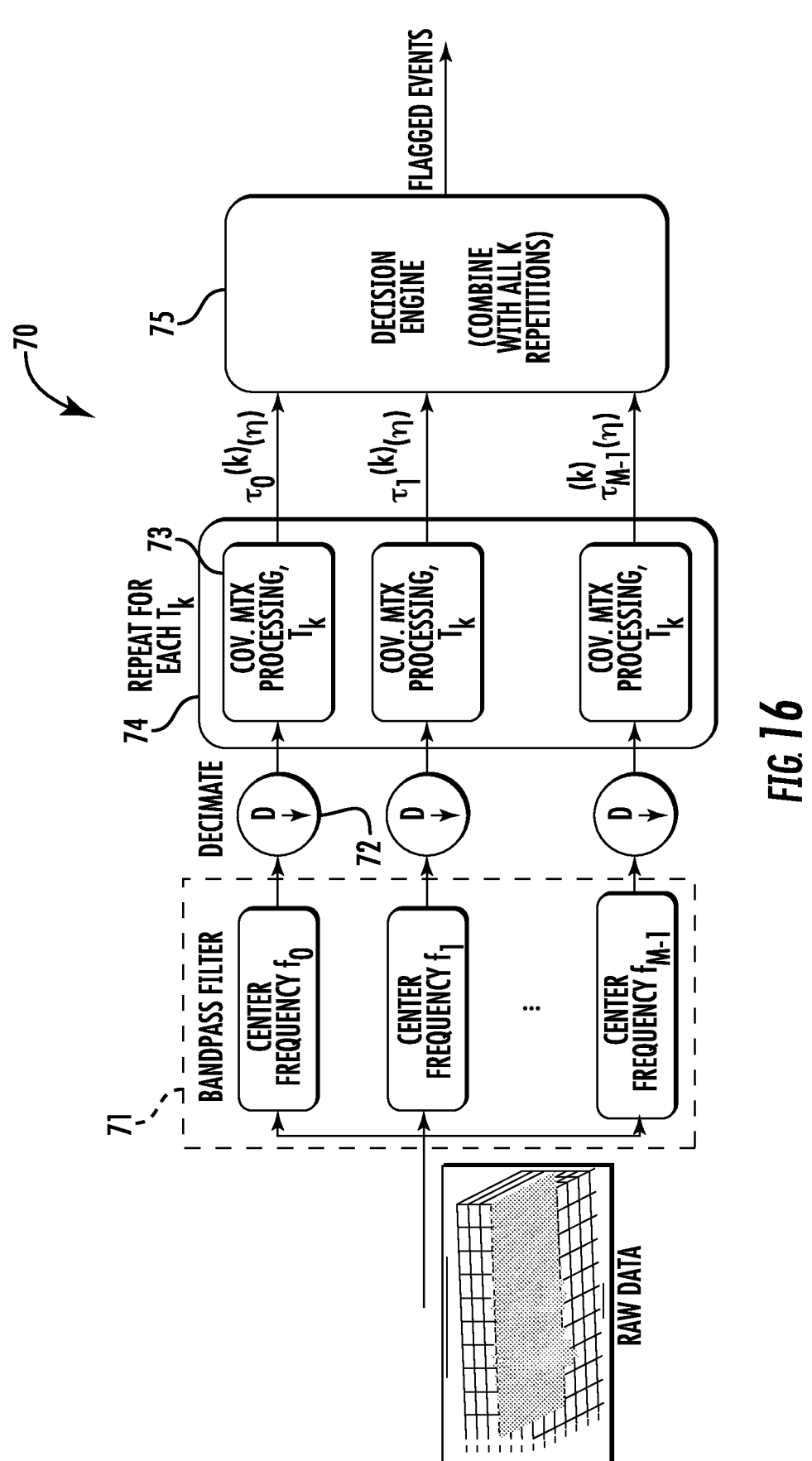
FIG. 16 is a schematic block diagram illustrating parallel channel processing operations which may be performed by the processor of the DAS system of FIG. 1.

Turning now to FIG. 16, an example parallel channelized processing configuration 70 which may be implemented by the processor 33 is now described. Raw DAS data is divided into respective channels by a bandpass filter(s) 71 with pass bands for respective channel frequencies. Each set of DAS data is decimated by respective decimators 72, and then processed by respective covariance matrix processing modules 73 of a processing block 74. The outputs of the covariance matrix processing modules 73 are input to a decision engine 75, which flags acoustic events as described above based upon the Toeplitz metric for different capture periods $T_k$ sec, where k=0, 1, . . . , K−1 (e.g., $T_0$=1 sec, $T_1$=10 sec, $T_2$=30 sec). This accounts for events of different frequencies and durations. This processing configuration provides for evaluation over M frequency sub-bands in parallel based upon the following covariance matrix metric:

$$\tau_m^{(k)}(n)$$

where τ is the Toeplitz metric, m is the frequency sub-band index, k is the capture period index, and n is the time index.

Figure 17:
FIG. 17 is a game theoretic reward matrix providing game theoretic output metric selection with channelization in an example embodiment.

Referring additionally to the game theoretic reward matrix 80 of FIG. 17, a game theoretic output metric selection approach with channelization that may be implemented by the processor 33 is now described. With respect to channelization, in some cases, it is known a priori which frequency bands to analyze. However, in other cases, it is not known which bands to observe. The present approach runs processing in parallel over multiple channels, and in some cases may be combined with the full band.

A baseline Toeplitz metric probability distribution is determined for background noise. Generally speaking, the scale of the Toeplitz metric alone may not be sufficient, and a threshold test may be used on each metric. Moreover, game theory is used upon detection of an acoustic event. This is done by normalizing the measured Toeplitz metrics $$\hat{\tau}_m^{(k)}(n)$$

and monitoring threshold crossings. Normalization may be performed against a distribution of background noise metrics, or based upon a detection threshold(s). A "one-sided game against nature" using the reward matrix 80 is performed, in which the rows are frequency bands (plus full-band if desired), and the columns are capture windows of different lengths. The data is combined from multiple capture periods, and an output vector (scalar) ranking order of preference for each sub-band may be provided as follows:

$$p_{out}(n) = \begin{bmatrix} p_0(n) \\ \vdots \\ p_{M-1}(n) \end{bmatrix}$$

The order-of-preference vector may then be passed along with a flagged raw data snapshot to fine event processing, for example.

The DAS system 30 advantageously provides a heuristic approach for estimating a background distribution of a signal/metric. It provides a self-calibrating procedure that may be run when a new DAS capture is processed. Furthermore, the DAS system 30 also provides for mapping of covariance matrices to scalar values. This captures the local increase in energy of a sub-population of fiber channels, and captures a local increase in correlation between neighboring sub-channels. The DAS 30 also allows for straightforward assembly of output event reports. For example, this may take the form of a table listing time stamps of each detected event and a maximum threshold exceeded. It may also flag snapshots of raw data for further processing if required. Other technical advantages which may be beneficial in some implementations are that no machine learning/deep learning is required. As such, no training nor labeled datasets are required. Moreover, the Toeplitz metric outputs may be used to help label raw datasets as well, and snapshots of raw data may also be flagged as detected events.

Figure 18:
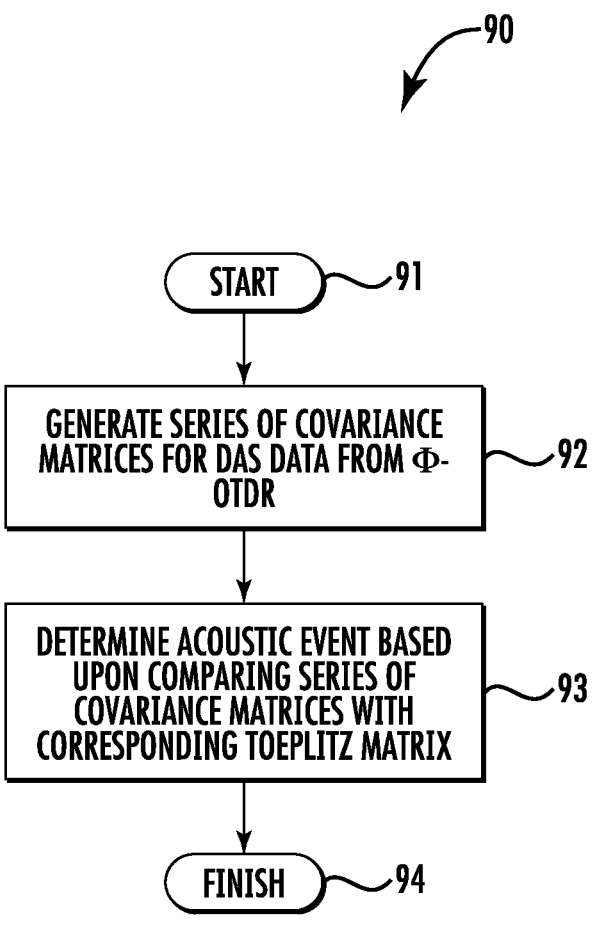
FIG. 18 is a flow diagram illustrating method aspects associated with the DAS system of FIG. 1.

Turning to the flow diagram 90 of FIG. 18, a related DAS method is now described. Beginning at Block 91, the method illustratively includes generating a series of covariance matrices using the processor 33 for DAS data from the φ-OTDR 32 coupled to the optical fiber 31 (Block 92), and determining an acoustic event using the processor based upon comparing the series of covariance matrices with a corresponding Toeplitz matrix, at Block 93, as discussed further above. The method of FIG. 18 illustratively concludes at Block 94.

Figure 19:
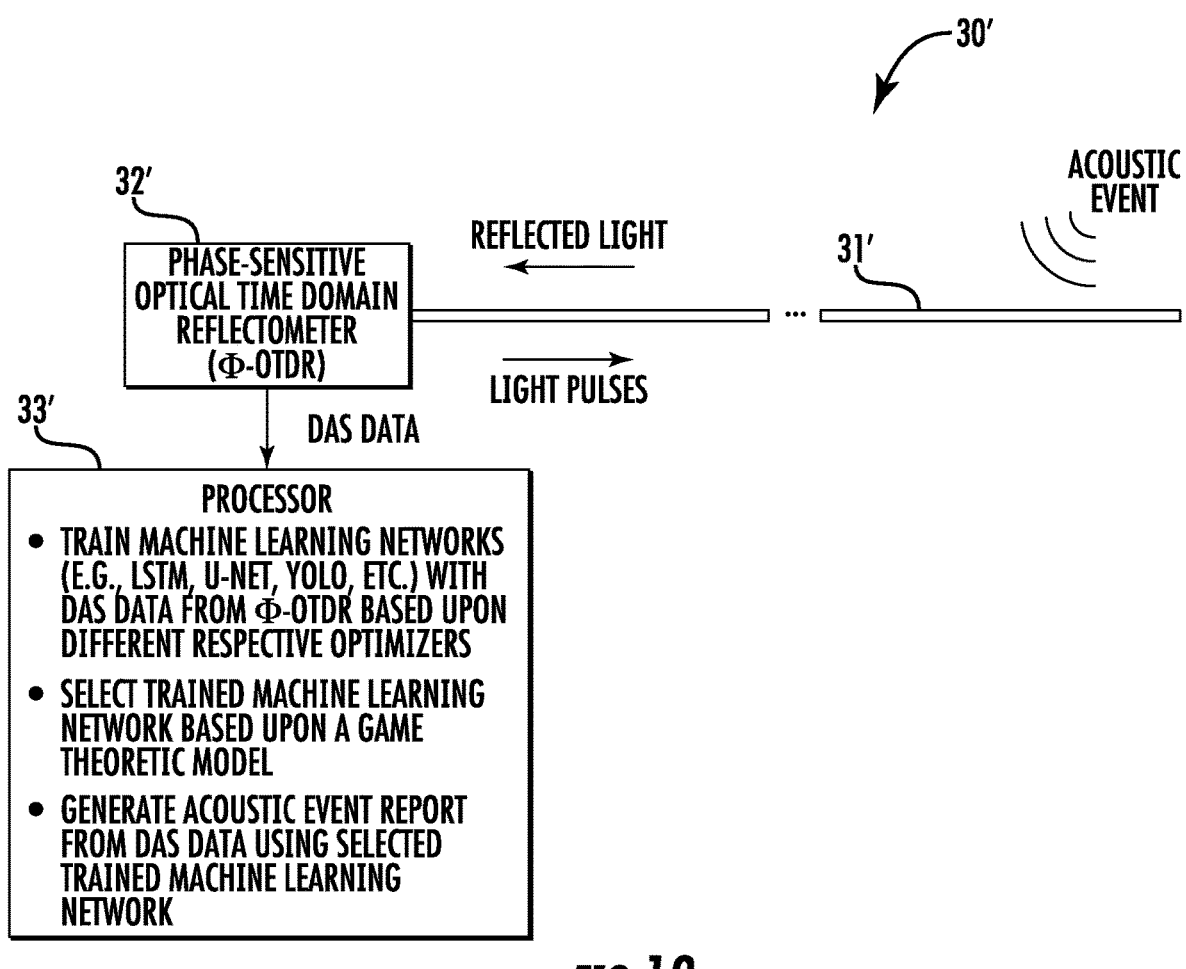
FIG. 19 is a schematic block diagram of DAS system in accordance with another example embodiment.

Turning to FIG. 19, another example embodiment of a DAS system 30' is now described. The DAS system 30' illustratively includes an optical fiber 31', a φ-OTDR 32' coupled to the optical fiber, and a processor 33' which cooperates with the φ-OTDR. Generally speaking, the processor 33' is configured to train a plurality of machine learning networks with DAS data from the φ-OTDR 32' based upon different respective optimizers, select a trained machine learning network from among the plurality thereof based upon a game theoretic model, and generate an acoustic event report from the DAS data using the selected trained machine learning network.

More particularly, the present approach provides for an ML analysis of array processed data to map a covariance matrix of a subset of fiber channels to a scalar value, as discussed further above. The processor 33' then trains respective ML networks (e.g., a Long Short Term Memory (LSTM) network) to recognize patterns in a 1D vector of metrics corresponding to event detections. Furthermore, game theoretic ensembling of the LSTM networks may be used to boost performance and reduce false alarm rates.

In accordance with an example embodiment, the processor 33' takes in raw/preprocessed data from the φ-OTDR 32' over a subpopulation of spatial channels, and forms covariance matrices for subsets of data in time, as discussed further above. The processor 33' then reduces each covariance matrix to a scalar value in a 1D vector of metrics (e.g., Toeplitz metrics), and passes the Toeplitz metrics through an LSTM neural network trained on recognizing events. This approach does not require modeling nor fitting of a probability distribution of metrics, nor manual threshold setting. The Toeplitz metrics temporal characteristics and duration may be different for varying events, but LSTM networks may learn these features and classify them accordingly. The game theory optimization trains an ensemble of LSTM networks with different optimizers, and then game theoretic methods may be used to optimally select the appropriate LSTM network for its output of an event/no event classification.

Figure 20:
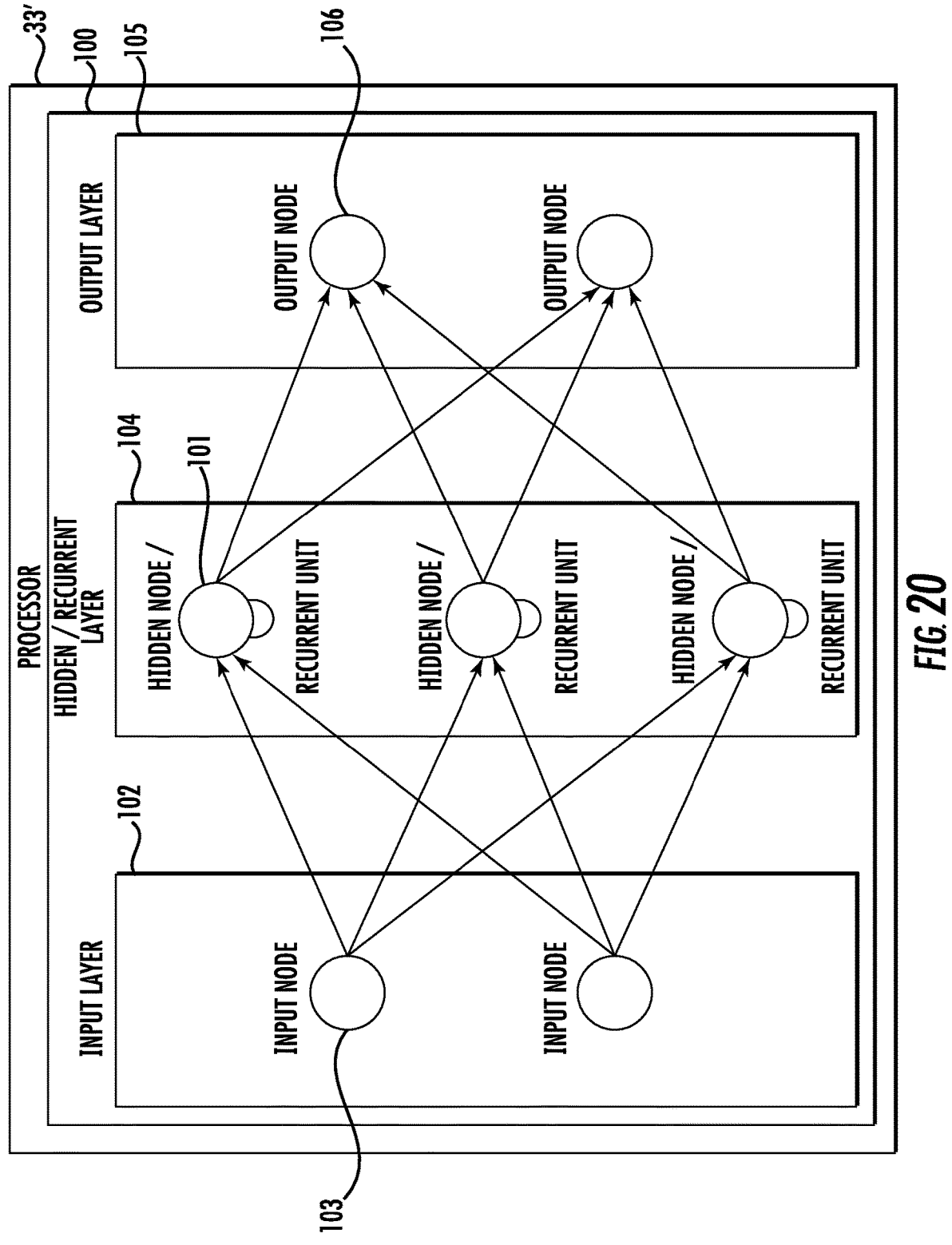
FIG. 20 is a schematic block diagram of a Long Short Term Memory (LSTM) configuration which may be implemented by the processor of the DAS system of FIG. 19 in an example embodiment.
Figure 21:
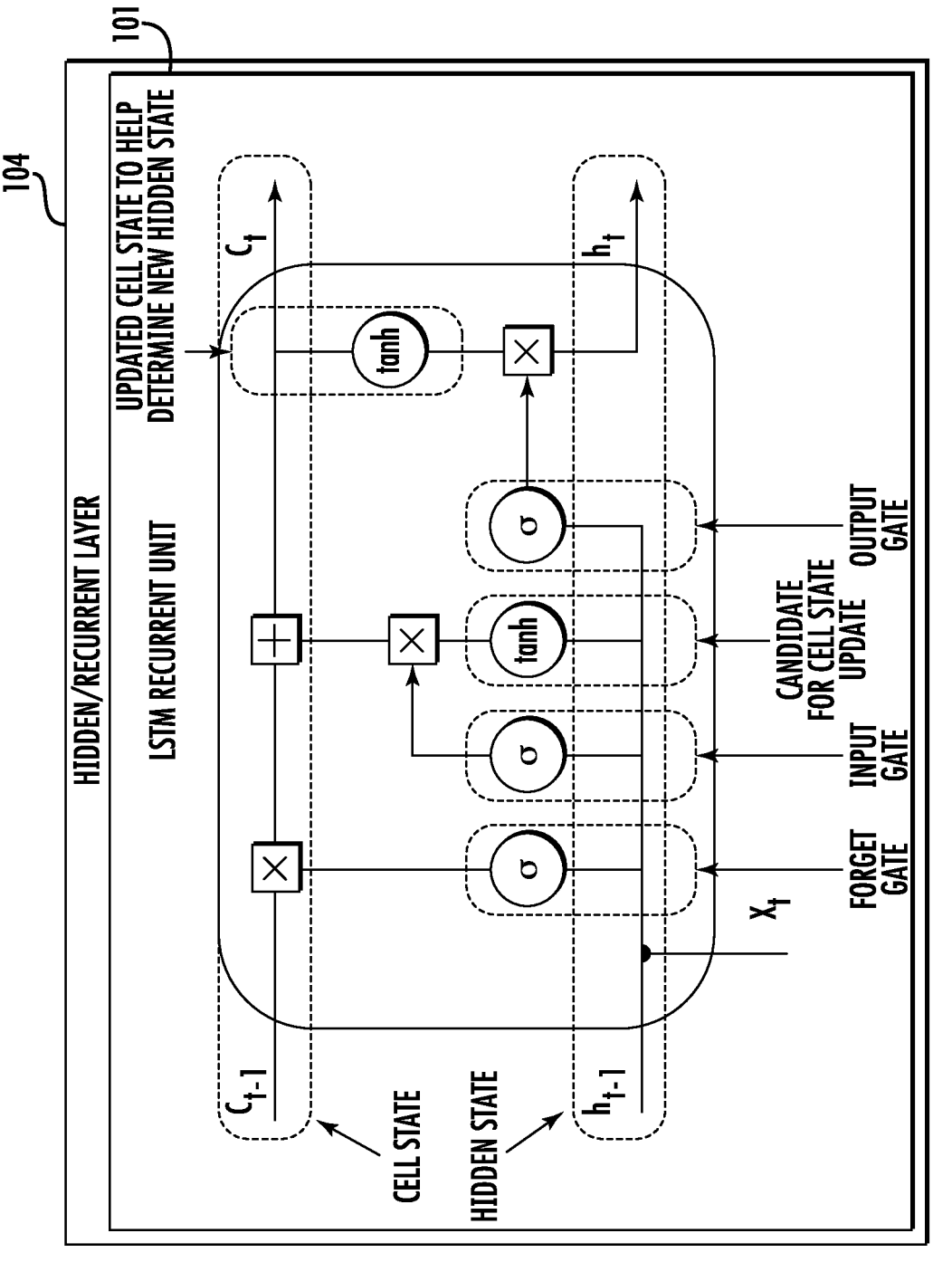
FIG. 21 is schematic flow diagram illustrating an LSTM recurrent unit for use with the configuration of FIG. 20.

An example LSTM network 100 is shown in FIG. 20, and an LSTM recurrent unit 101 for use within the LSTM network is shown in FIG. 21. The LSTM network 100 illustratively includes an input layer 102 including a plurality of input nodes 103, followed by a hidden/recurrent layer 104 including recurrent units 101, and an output layer 105 including output nodes 106. LSTM learns temporal behavior and characteristics of input data through manipulation of hidden state(s). The input illustrated configuration provides multiple gates for regulating new and prior information. New and prior information may be added, updated, or forgotten as appropriate. The LSTM network 100 may also be implemented as a bidirectional LSTM network in some embodiments.

Figure 22:
FIG. 22 is a schematic block diagram illustrating an example game theoretic ensemble LSTM optimization configuration which may be implemented by the processor of the DAS system of FIG. 19.
Figure 22:
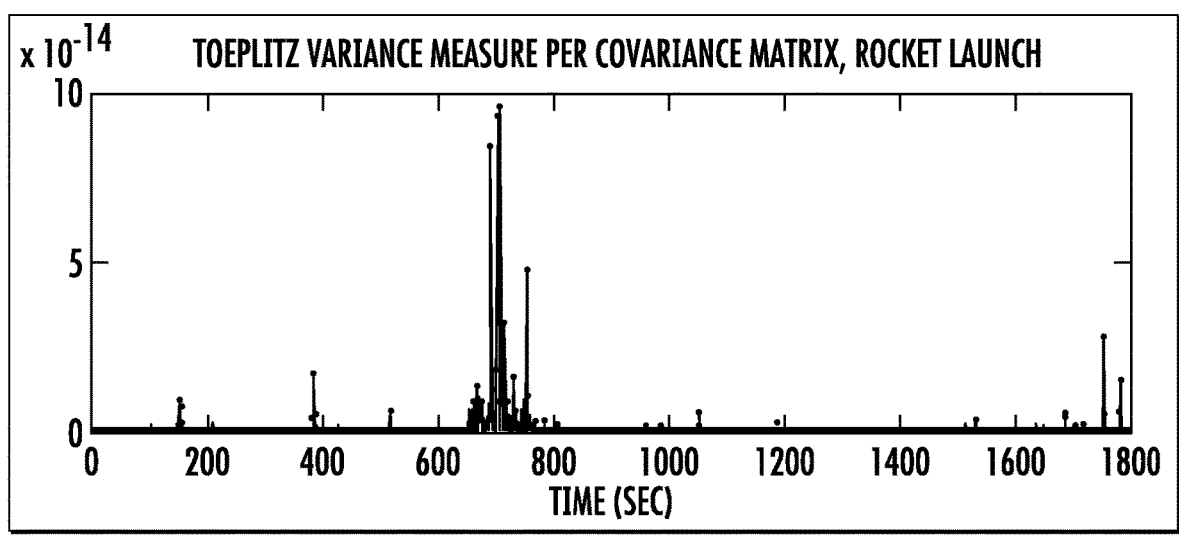
Figure 22:
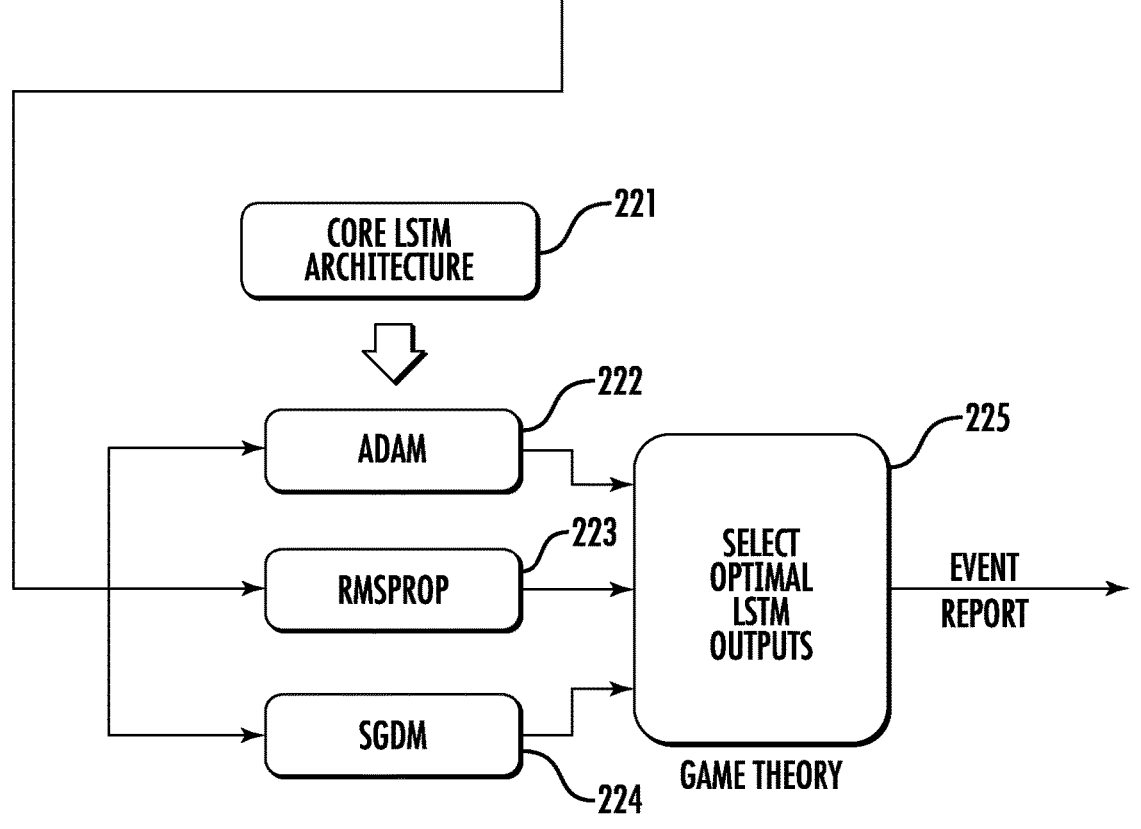

Turning now to FIG. 22, an example game theoretic ensemble optimization solver 220 which may be implemented by the processor 33' is now described. The illustrated solver 220 trains multiple identical core LSTM architectures with different optimizers, which in the present example are an Adaptive Moment Estimation (ADAM) optimizer 222, a Root Mean Square Propagation (RMSProp) optimizer 223, and a Stochastic Gradient Descent with Momentum (SGDM) optimizer 224 (although other types and combinations of optimizers may be used in different embodiments). Furthermore, a game theory module 225 builds a reward matrix from probabilistic outputs of each individual network, and uses a linear program solution to provide the optimal choice of the trained LSTM networks for the final output and event report determination.

The present approach accordingly provides a deep learning (LSTM) monitor for single-dimension metrics from covariance matrix processing of DAS data. Covariance matrix-based event detection via deep machine learning may be appropriate when it is desirable to avoid the need for a priori assumption of scalar metric distribution. Further, it may also be appropriate in that no thresholds are required, nor is any user-specified constant false alarm rate required. Moreover, the game theoretic-optimal ensembling advantageously leverages an ensemble of LSTM networks for enhanced performance to optimally select the "best" LSTM subnetwork for each input to the ML system.

Another example game theoretic ensemble optimization which may be implemented by the processor 33' is now described. This approach advantageously uses ML image segmentation for event classification. A limited-duration raw/preprocessed set of DAS data may be flagged a priori as including an acoustic event using the covariance matrix approach described above. The present approach may then merge U-Net and You Only Look Once (YOLO) ML techniques to analyze raw/preprocessed data associated with flagged events.

By way of background, U-Net is a type of Convolutional Neural Network (CNN) with residual connections that can recognize objects/events at different scales, and classify each pixel in an image. YOLO can detect numerous, closely-spaced objects using a tiled grid of bounding boxes. In the present approach, an input flagged snapshot of raw/preprocessed data may be processed through U-Net architecture as a 2D image. Each "pixel" (time-frequency unit) is classified across the entire image, and a classification label for each time-frequency unit is performed (similar to "colorizing" an image). A game theoretic ensemble optimization of U-Net outputs is then performed. Furthermore, both the raw/pre-processed data image and U-Net classification labels may be provided as inputs to YOLO processing, which provides localization by placing bounding boxes around events. Moreover, YOLO may also classify events inside bounding boxes, and a game theoretic ensemble optimization of the YOLO outputs may also be performed.

Figure 23:
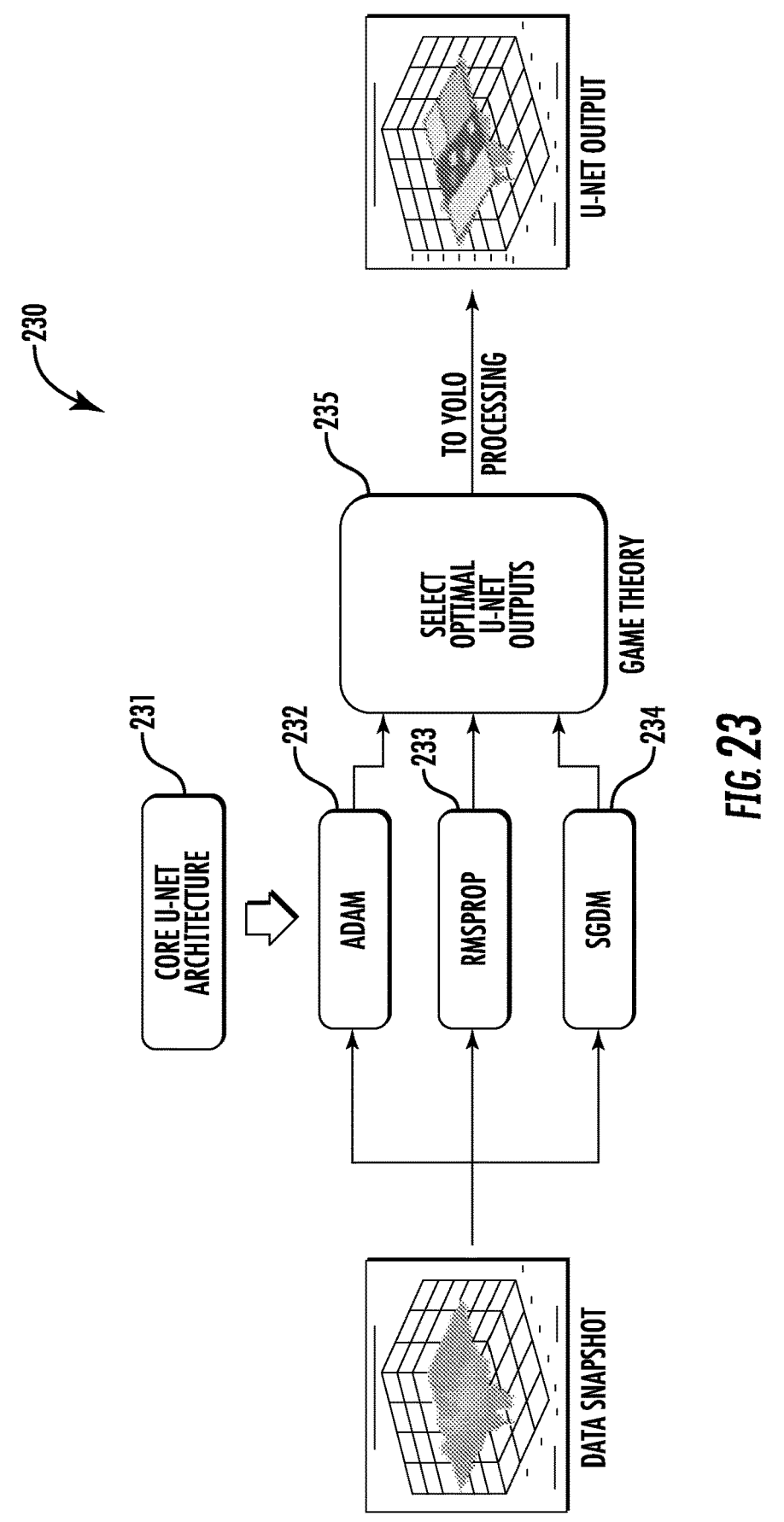
FIG. 23 is a schematic block diagram illustrating another example game theoretic ensemble U-Net optimization configuration which may be implemented by the processor of the DAS system of FIG. 19.

Referring to FIG. 23, an example game theoretic ensemble optimization solver 230 which may be implemented by the processor 33' is now described. The illustrated solver 230 trains multiple identical core U-Net architectures with different optimizers, which in the present example are an ADAM optimizer 232, an RMSProp optimizer 233, and an SGDM optimizer 234. Furthermore, a game theory module 235 builds a reward matrix from probabilistic outputs of each individual network, and uses a linear program solution to provide the optimal choice of the trained U-Net networks for the U-Net output for YOLO processing.

Figure 24:
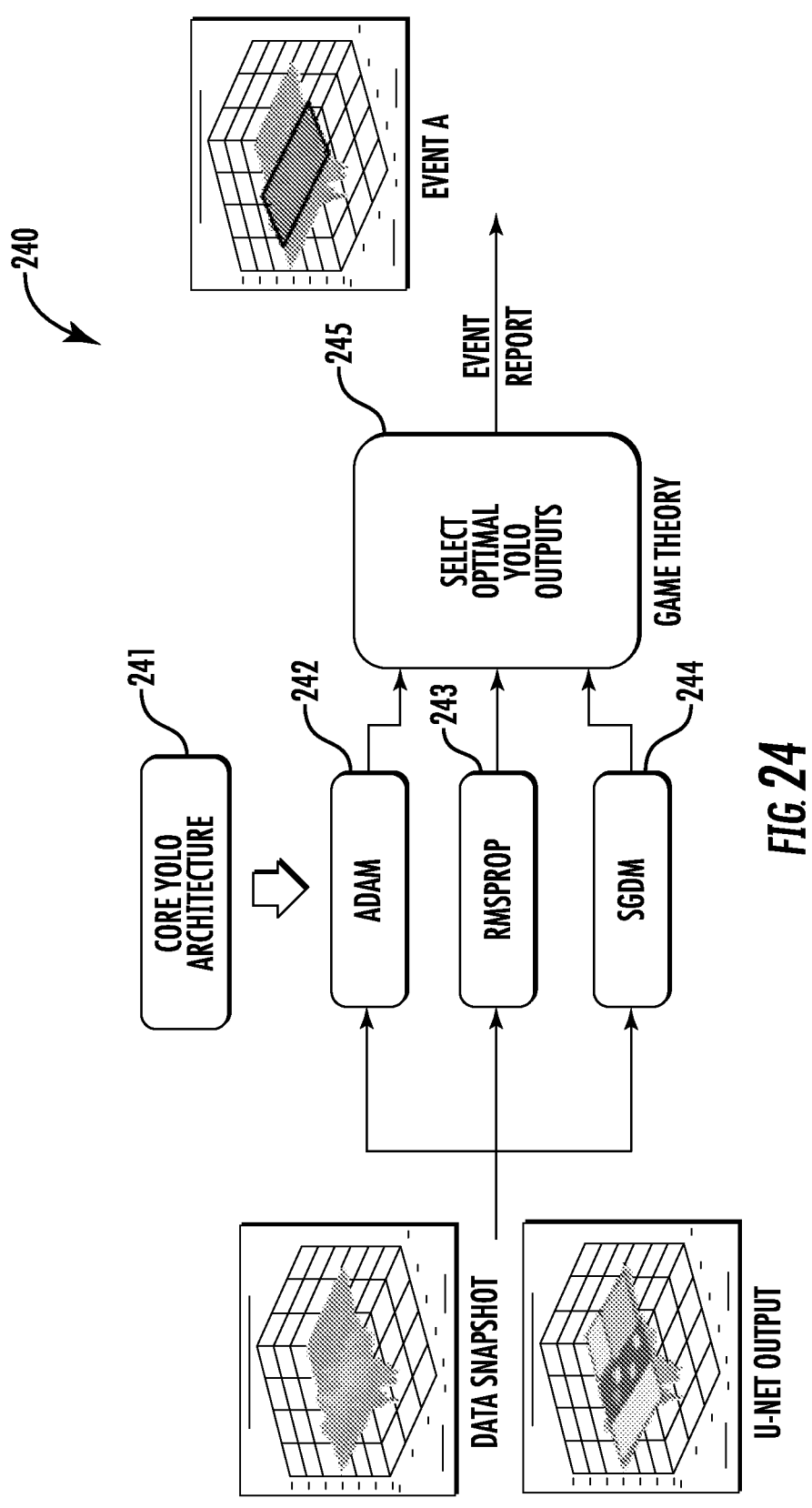
FIG. 24 is a schematic block diagram illustrating still another example game theoretic ensemble You Only Look Once (YOLO) optimization configuration which may be implemented by the processor of the DAS system of FIG. 19.

Referring additionally to FIG. 24, an example YOLO game theoretic ensemble optimization solver 240 is now described. The illustrated solver 240 trains multiple identical core YOLO architectures with different optimizers, which in the present example are an ADAM optimizer 242, an RMSProp optimizer 243, and an SGDM optimizer 244. Furthermore, a game theory module 245 builds a reward matrix from probabilistic outputs of each individual network, and uses a linear program solution to provide the optimal choice of the trained YOLO networks for the event report output.

The solver 240 detects numerous, closely-spaced objects for image segmentation to autonomously place bounding boxes around detected events and classify the contents of bounded event boxes. U-Net class labels for each time-frequency unit (image pixel) are provided as parallel input channels, and the game theoretic optimal ensembling of the different YOLO networks is based upon the optimally ensembled U-Net outputs.

The above-described deep learning approach advantageously provides instance segmentation and event classification of DAS data via merged U-Net and YOLO processing. Fine event classification may be performed on snapshots of data tagged by the covariance matrix approach described above, and input data from a population of fiber virtual channels may be provided as an image into the U-Net configuration 230, which "colorizes" each pixel to provide additional information/confidence to the YOLO configuration 240. The YOLO configuration 240 associates instances of event pixels together and provides bounding boxes with classification labels. This allows the DAS system 30' to more finely localize instances of each event in both time and space, and provide enhanced confidence of each detected instance. Furthermore, the game theoretic ensembling of U-Net and YOLO networks advantageously boosts performance.

Figure 25:
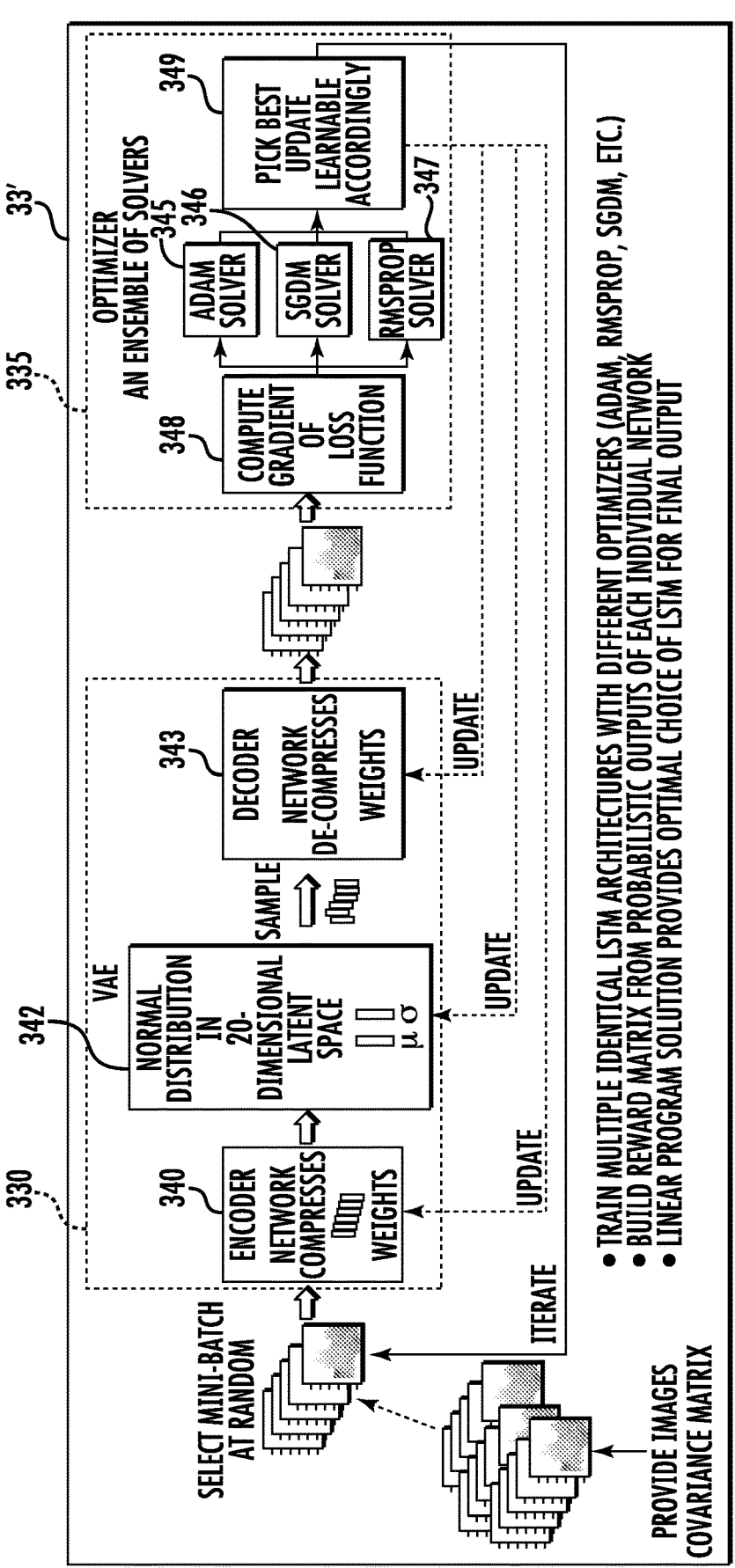
FIG. 25 is a schematic block diagram of an example implementation of the processor of the DAS system of FIG. 19 for providing latent space acoustic event detection using a game theoretic optimization.

Turning to FIG. 25, an example implementation of the processor 33' to implement an optional VAE 330 with a deep learning solver 335 (such as one of the solvers 220, 230, 240) is now described. The VAE 330 illustratively includes an encoder 340 which learns to compress (reduce) a selected batch of DAS input data 344 into an encoded representation of a normal distribution in latent space provided by a neural network 342 (e.g., a CNN). A decoder 343 learns to reconstruct the original data from the encoded representation to be as close to the original input as possible. The latent space is the layer that contains the compressed representation of the input data.

The VAE 330 differs from regular autoencoders in that it does not use the encoding-decoding process simply to reconstruct an input. Instead, the VAE 330 imposes a probability distribution on the latent space and learns the distribution so that the distribution of the outputs from the decoder 343 matches that of the observed data. The VAE 330 assumes that the source data has some sort of underlying probability distribution (such as Gaussian) and then attempts to find the parameters of the distribution.

The illustrated configuration advantageously provides an effective way to generate synthetic data for training ML applications, such as the above-described acoustic event detection. In particular, this may be done while maintaining the underlying statistical properties of the original dataset. Furthermore, it may be applicable to sensitive datasets where traditional data-masking falls short of protecting the data, and it may provide faster methods of generating synthetic training data for ML applications.

By way of background, a VAE is a generative system, and serves a similar purpose as a generative adversarial network. One main use of a VAE is to generate new data that is related to the original source data by sampling from the learned distribution. Utilizing the learned distribution provides a way of generating synthetic data that is reflective of naturally occurring variations, rather than simply replicating existing data samples. This new synthetic data may be utilized for additional training and testing analysis. Moreover, a VAE is a generative model which may randomly generate new samples based on the learned distribution. However, unlike traditional generative models that require strong assumptions regarding data structures and long inference times, a VAE makes weak assumptions of the data which also leads to faster training.

The VAE 330 forces input images onto an n-dimensional probability distribution, (e.g., a 20-dimensional Gaussian spread in the present example), learns the associated parameters (e.g., the means and variances for a Gaussian distribution), and describes the position data with the resulting distribution. Synthetic data samples may be randomly generated from a probability distribution extracted from the latent space once the associated parameter state vectors are calculated.

A two-step process may be used to generate synthetic data samples by (1) using the VAE 330 to learn the statistical properties of the original dataset(s) sampled from the Operational Design Domain (ODD); and (2) using the deep learning solver 335 as an optimizer for sampling the learned distribution and applying algorithmic transformations (e.g., rotations, reflections and attenuation) that enable building of richer datasets to support the ML model Verification and Validation (V&V) process. More particularly, this approach provides an enhanced VAE-based process flow to learn the distribution and associated statistical properties of the original dataset (ideally the distribution of data in the ODD).

As noted above, the DAS data may be converted to 2D vectors to leverage the convolutional neural network(s) 342 which underlies the VAE 330. For image-based inputs, an image gradient Sobel edge detector may be used as a pre-processing step. This preprocessing step helps the Deep Learning Convolutional Neural Network models to learn more quickly and with more accuracy. Next, the DAS data is provided to the encoder 340 of the VAE 330. The encoder 340 forces the input data 344 onto the multidimensional probability distribution. In the present example, this is a 20-dimensional multivariate Gaussian distribution, although other distributions and dimensions may be utilized in different embodiments. The VAE 330 learns the means and variances of the data, and the resulting distribution describes the data.

The encoder 340 generates a compressed representation of the input data utilizing various weights and biases. Weights are the parameters within the neural network 342 that transform input data within the network's hidden layers. Generally speaking, the neural network 342 is made up of a series of nodes. Within each node is a set of inputs, weight, and a bias value. As an input enters the node, it gets multiplied by a weight value, and the resulting output is either observed or passed to the next layer in the neural network 342. The weights of the neural network 342 may be included within the hidden layers of the network. Within the neural network 342, an input layer may take the input signals and pass them to the next layer. Then, the neural network 342 includes a series of hidden layers which apply transformations to the input data. It is within these nodes of the hidden layers that the weights are applied. For example, a single node may take the input data and multiply it by an assigned weight value, then add a biasing residue before passing the data to the next layer. The final layer of the neural network 342 is known as the output layer. The output layer often tunes the inputs from the hidden layers to produce the desired numbers in a specified range.

Weights and bias values are both learnable parameters inside the network 342. The neural network 342 may randomize both the weight and bias values before initial learning. As training continues, both parameters may be adjusted toward the desired values and the correct output. The two parameters differ in the extent of their influence upon the input data. At its simplest, bias represents how far off the predictions are from their intended value. Biases make up the difference between the function's output and its intended output. A low bias suggests that the network 342 is making more assumptions about the form of the output, whereas a high bias value makes less assumptions about the form of the output. Weights, on the other hand, can be thought of as the strength of the connection. Weight affects the amount of influence a change in the input will have upon the output. A low weight value will have no change on the input, and alternatively a larger weight value will change the output more significantly.

The compressed representation of the input data is called the hidden vector. The mean and variance from the hidden vector are sampled and learned by the CNN 342. Principal component analysis (PCA) of the hidden vector allows for the visualization of n-dimensional point clusters, e.g., 3-D point clusters, in the latent space. To make calculations more numerically stable, the range of possible values may be increased by making the network learn from the logarithm of the variances. Two vectors may be defined: one for the means, and one for the logarithm of the variances. Then, these two vectors may be used to create the distribution from which to sample.

The decoder 343 generates synthetic output data. The deep learning solver 335 functions as an optimizer which uses an ensemble of solvers 345-347 with a game theoretic implementation to create an output image with minimal image reconstruction error. An input module 348 computes a gradient of loss function from the synthetic output data, and an output module 349 picks the best update based upon the solvers 345-347. More particularly, the optimizer process is iterated via re-parameterization to handle sampling of the hidden vector during backpropagation (an algorithm for training neural networks). In the illustrated example, an ensemble of models is generated using the three different solvers, namely an ADAM solver 345, an SGDM solver 346, and an RMSProp solver 347, although different solvers may be used in different embodiments. The values from the loss function (evidence lower bound or ELBO, reconstruction, and Kullback-Leibler or KL loss) may be used in a game theoretic implementation to determine the optimal model to use per test sample. The loss is used to compute the gradients of the solvers.

To summarize, the processor 33' illustrated in FIG. 25 performs the following steps:

a) Providing DAS input data 344 to the encoder 340 of the VAE 330;

b) Compressing the input data using a first set of weights with the encoder;

c) Creating a normal distribution of the compressed position data in a latent space of the VAE;

d) Decompressing the compressed position data from the latent space using a second set of weights with the decoder 343 of the VAE;

e) Optimizing the decompressed position data from the decoder, which may further include (i) generating multiple probabilistic models of the decoded position data, and (ii) determining which of the multiple models is optimal by applying a game theoretic optimization to select which model to use;

f) Updating at least the first and second set of weights based on the loss detected in the optimized decompressed image data, which may include (i) applying a game theoretic optimization to the models; and (ii) selecting which model (e.g., ADAM, SGDM, or RMSProp) to use to update the first and second sets of weights; and g) Iterate steps b)-f) until the decompressed position data possesses substantially the same statistical (quasi-deterministic behavior) properties as the input data (such statistics include ELBO loss, which is reconstruction loss plus KL loss).

Steps b)-f) may be iterated until the error does not statistically decrease and validation patience is achieved (i.e., the number of times that the validation loss can be larger than or equal to the previously smallest loss before network training stops).

Once the latent space distribution of the original dataset has been learned/optimized, synthetic datasets may be generated. For example, a sample may be randomly generated from the learned distribution in latent space. Next, the decoder 343 may be applied to the sample to generate a new datum. Afterwards, algorithmic transformations may be applied, as appropriate, to generate additional data points for the validation test dataset. Multiple transformations may be applied to a single sample from the latent space distribution, to quickly increase the size of a synthetic dataset.

The above-described VAE approach fits data to multivariate normal distributions in a high-dimensional latent space. The above-described approach applies traditional ML clustering techniques to separate latent space representations for different events, which may advantageously help reduce false alarms from scalar metric outputs. Moreover, this may also provide an explainable mechanism for identifying/classifying events in raw data snapshots, and the associated game theoretic ensembling of VAEs help boost performance of VAE system.

Figure 26:
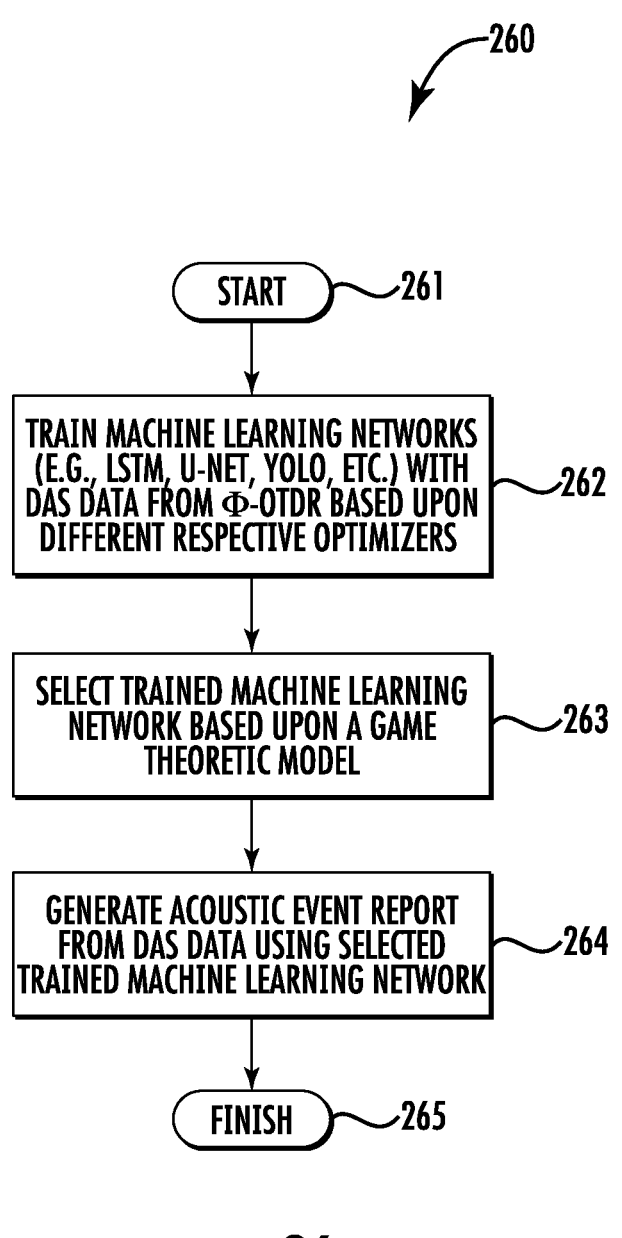
FIG. 26 is a flow diagram illustrating method aspects associated with the DAS system of FIG. 19.

A related DAS method is now described with reference to the flow diagram 260 of FIG. 26. The method beings (Block 261) with training a plurality of machine learning networks (LSTM, U-Net/YOLO, etc.) using the processor 33' with DAS data from the φ-OTDR 32' based upon different respective optimizers (e.g., ADAM, SGDM, RMSprop, etc.), at Block 262. The method further illustratively includes selecting a trained machine learning network from among the plurality thereof using the processor 33' based upon a game theoretic model, at Block 263, and generating an acoustic event report from the DAS data using the processor and the selected trained machine learning network (Block 264), as discussed further above. The method of FIG. 26 illustratively concludes at Block 265.

Figure 27:
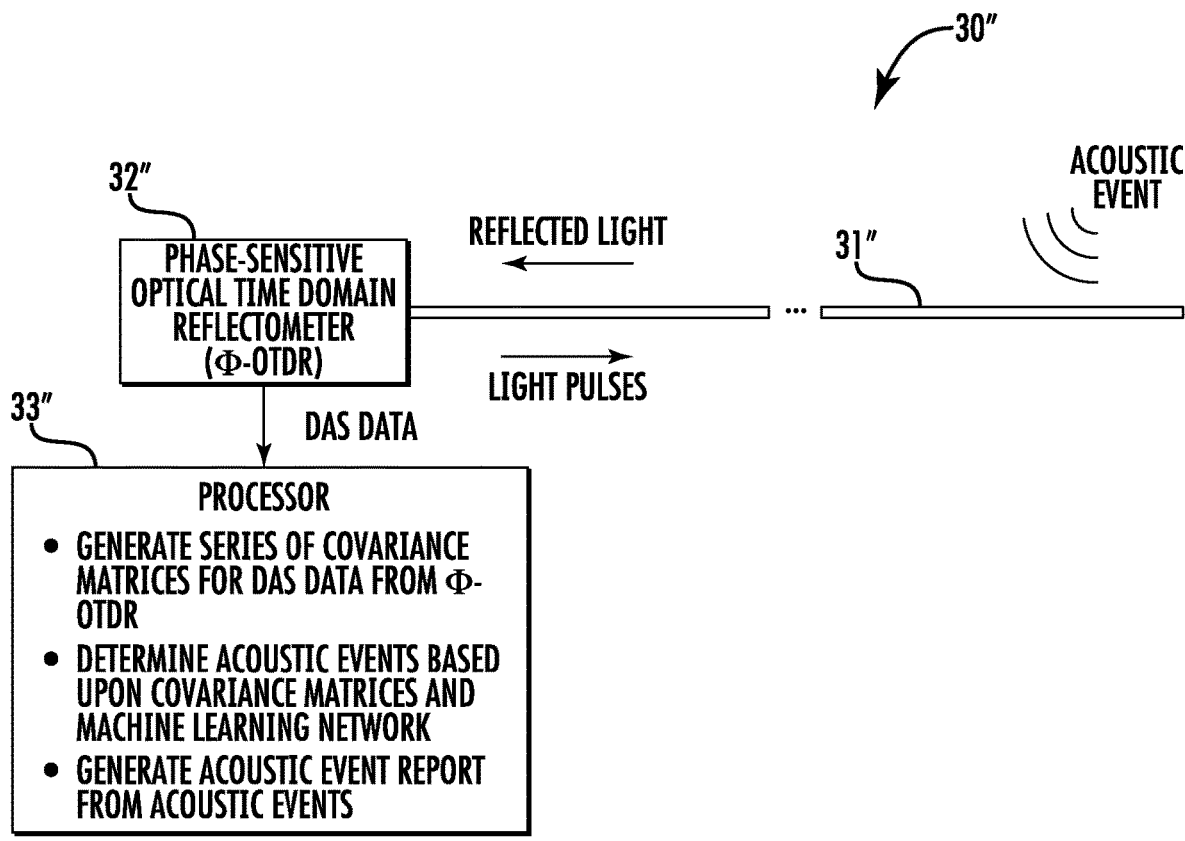
FIG. 27 is a schematic block diagram of DAS system in accordance with still another example embodiment.

It should be noted that game theory optimization is not required in all embodiments. Referring additionally to FIG. 27, another example DAS system illustratively includes an optical fiber 31", φ-OTDR 32", and processor 33" similar to those described above. Here, the processor 33" is configured to generate a series of covariance matrices for DAS data from the φ-OTDR 32", determine acoustic events based upon the covariance matrices and a machine learning network (e.g., LSTM, U-Net/YOLO, etc.), and generate an acoustic event report from the determined acoustic events.

Figure 28:
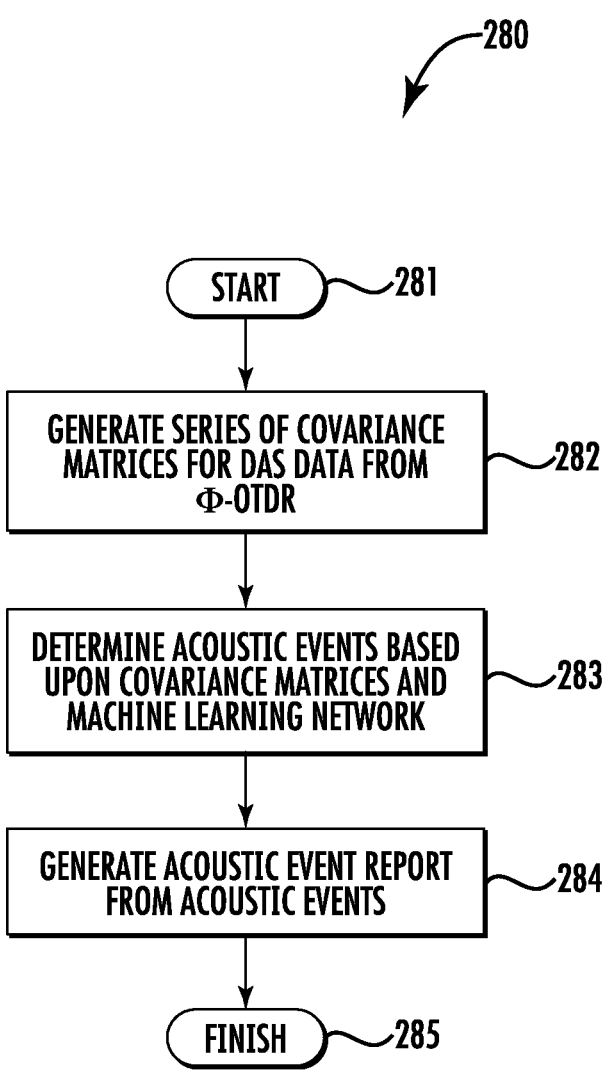
FIG. 28 is a flow diagram illustrating method aspects associated with the DAS system of FIG. 27

A related method is now described with reference to the flow diagram 280 of FIG. 28. The method begins (Block 281) with generating a series of covariance matrices for DAS data from the φ-OTDR 32" using the processor 33" (Block 282), determining acoustic events using the processor based upon the covariance matrices and a machine learning network (Block 283), and generating an acoustic event report from the acoustic events using the processor (Block 284), as discussed further above. The method of FIG. 28 illustratively concludes at Block 285.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A distributed acoustic sensing (DAS) system comprising:
an optical fiber;
a phase-sensitive optical time domain reflectometer (φ-OTDR) coupled to the optical fiber; and
a processor cooperating with the φ-OTDR and configured to generate a series of covariance matrices for DAS data from the φ-OTDR, and
determine an acoustic event based upon comparing the series of covariance matrices with a corresponding Toeplitz matrix.

2. The DAS system of claim 1 wherein the processor is further configured to generate a histogram for the DAS data and determine a noise power level from the histogram; and wherein the processor determines the acoustic event further based upon the noise power level.

3. The DAS system of claim 1 wherein the processor is further configured to perform a weighted combination of polynomial fitting and median filtering in a frequency domain to fit a curve to the DAS data, determine a noise power level from the curve, and determine the acoustic event further based upon the noise power level.

4. The DAS system of claim 1 wherein the processor is further configured to map the acoustic event to a spatial channel from among a plurality of spatial channels, the plurality of spatial channels corresponding to different positions along the optical fiber.

5. The DAS system of claim 4 wherein the processor is configured to determine acoustic events for a plurality of different spatial channels based upon comparing the series of covariance matrices with different corresponding Toeplitz matrices.

6. The DAS system of claim 5 wherein the processor is further configured to generate an order of preference for the acoustic events using a game theoretic model.

7. The DAS system of claim 5 wherein the processor is further configured to generate an output event table including scalar values and timestamps of detected events for respective spatial channels.

8. The DAS system of claim 1 wherein the processor is further configured to perform bandpass filtering and re-centering of the DAS data relative to at least one spatial channel prior to generating the series of covariance matrices.

9. A distributed acoustic sensing (DAS) device comprising:
a phase-sensitive optical time domain reflectometer (φ-OTDR) to be coupled to an optical fiber; and
a processor cooperating with the φ-OTDR and configured to
generate a series of covariance matrices for DAS data from the φ-OTDR, and
determine an acoustic event based upon comparing the series of covariance matrices with a corresponding Toeplitz matrix.

10. The DAS device of claim 9 wherein the processor is further configured to generate a histogram for the DAS data and determine a noise power level from the histogram; and wherein the processor determines the acoustic event further based upon the noise power level.

11. The DAS device of claim 9 wherein the processor is further configured to perform polynomial fitting in a frequency domain to fit a curve to the DAS data, and determine a noise power level from the curve; and wherein the processor determines the acoustic event further based upon the noise power level.

12. The DAS device of claim 9 wherein the processor is further configured to map the acoustic event to a spatial channel from among a plurality of spatial channels, the plurality of spatial channels corresponding to different positions along the optical fiber.

13. The DAS device of claim 12 wherein the processor is configured to determine acoustic events for a plurality of different spatial channels based upon comparing the series of covariance matrices with different corresponding Toeplitz matrices.

14. The DAS device of claim 13 wherein the processor is further configured to generate an order of preference for the acoustic events using a game theoretic model.

15. A distributed acoustic sensing (DAS) method comprising:

generating a series of covariance matrices using a processor for DAS data from a phase-sensitive optical time domain reflectometer ($\varphi$-OTDR) coupled to an optical fiber; and determining an acoustic event using the processor based upon comparing the series of covariance matrices with a corresponding Toeplitz matrix.

16. The method of claim 15 further comprising using the processor to generate a histogram for the DAS data and determine a noise power level from the histogram; and wherein the determining comprises determining the acoustic event further based upon the noise power level.

17. The method of claim 15 further comprising using the processor to perform polynomial fitting in a frequency domain to fit a curve to the DAS data, and determine a noise power level from the curve; and wherein determining comprises determining the acoustic event further based upon the noise power level.

18. The method of claim 15 further comprising using the processor to map the acoustic event to a spatial channel from among a plurality of spatial channels, the plurality of spatial channels corresponding to different positions along the optical fiber.

19. The method of claim 18 further comprising using the processor to determine acoustic events for a plurality of different spatial channels based upon comparing the series of covariance matrices with different corresponding Toeplitz matrices.

20. The method of claim 19 further comprising using the processor to generate an order of preference for the acoustic events using a game theoretic model.

* * * * *